United States Patent
Joo et al.

(10) Patent No.: US 11,863,735 B2
(45) Date of Patent: Jan. 2, 2024

(54) CAMERA MODULE

(71) Applicant: LG INNOTEK CO., LTD., Seoul (KR)

(72) Inventors: Yang Hyun Joo, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 223 days.

(21) Appl. No.: 17/607,741

(22) PCT Filed: Apr. 27, 2020

(86) PCT No.: PCT/KR2020/005491
§ 371 (c)(1),
(2) Date: Oct. 29, 2021

(87) PCT Pub. No.: WO2020/222477
PCT Pub. Date: Nov. 5, 2020

(65) Prior Publication Data
US 2022/0210393 A1  Jun. 30, 2022

(30) Foreign Application Priority Data

Apr. 29, 2019 (KR) .................. 10-2019-0049706

(51) Int. Cl.
*H04N 13/271* (2018.01)
*H04N 13/32* (2018.01)
*H04N 23/55* (2023.01)

(52) U.S. Cl.
CPC .......... *H04N 13/271* (2018.05); *H04N 13/32* (2018.05); *H04N 23/55* (2023.01)

(58) Field of Classification Search
CPC ....... H04N 13/271; H04N 13/32; H04N 23/55
See application file for complete search history.

(56) References Cited

U.S. PATENT DOCUMENTS

| | | | | |
|---|---|---|---|---|
| 8,456,517 B2* | 6/2013 | Spektor | ................ | H04N 13/207 348/E13.001 |
| 8,717,417 B2* | 5/2014 | Sali | ...................... | H04N 13/254 348/222.1 |

(Continued)

FOREIGN PATENT DOCUMENTS

| | | |
|---|---|---|
| CN | 104081528 A | 10/2014 |
| JP | 2011-128024 A | 6/2011 |

(Continued)

*Primary Examiner* — Mishawn N. Hunter
(74) *Attorney, Agent, or Firm* — Birch, Stewart, Kolasch & Birch, LLP

(57) ABSTRACT

According to an embodiment of the present invention, disclosed is a camera module comprising: an optical output unit for outputting an optical signal to an object; an optical unit for transmitting the optical signal reflected from the object; a sensor for receiving the optical signal transmitted through the optical unit; and a control unit for acquiring the depth map of the object by using the optical signal received by the sensor, wherein the sensor includes an effective area in which a light receiving element is arranged and a non-effective area excluding the effective area, and includes a first row area in which the effective area and the non-effective area are alternately arranged in a row direction, and a second row area in which the effective area and the non-effective area are alternately arranged in the row direction, and in which the effective area is arranged in a column direction at a position not overlapping with the effective area of the first row area, light reaching the effective area of the first row area is controlled by means of first shifting control so as to reach the non-effective area of the first row area or the non-effective area of the second row area, and light reaching the effective area of the second row area is controlled by means of the first shifting control so as to reach the non-effective area of the second row area or the non-effective area of the first row area.

20 Claims, 23 Drawing Sheets

(56) References Cited

U.S. PATENT DOCUMENTS

| | | | |
|---|---|---|---|
| 10,152,801 B2* | 12/2018 | Shpunt | ............ H04N 13/239 |
| 2011/0074989 A1 | 3/2011 | Fossum et al. | |
| 2014/0055565 A1 | 2/2014 | You et al. | |
| 2015/0001664 A1 | 1/2015 | Van Der Tempel et al. | |
| 2017/0105020 A1 | 4/2017 | Wajs et al. | |

FOREIGN PATENT DOCUMENTS

| | | |
|---|---|---|
| KR | 10-2011-0033567 A | 3/2011 |
| KR | 10-2014-0027815 A | 3/2014 |
| KR | 10-2014-0110986 A | 9/2014 |
| KR | 10-2017-0042226 A | 4/2017 |

* cited by examiner

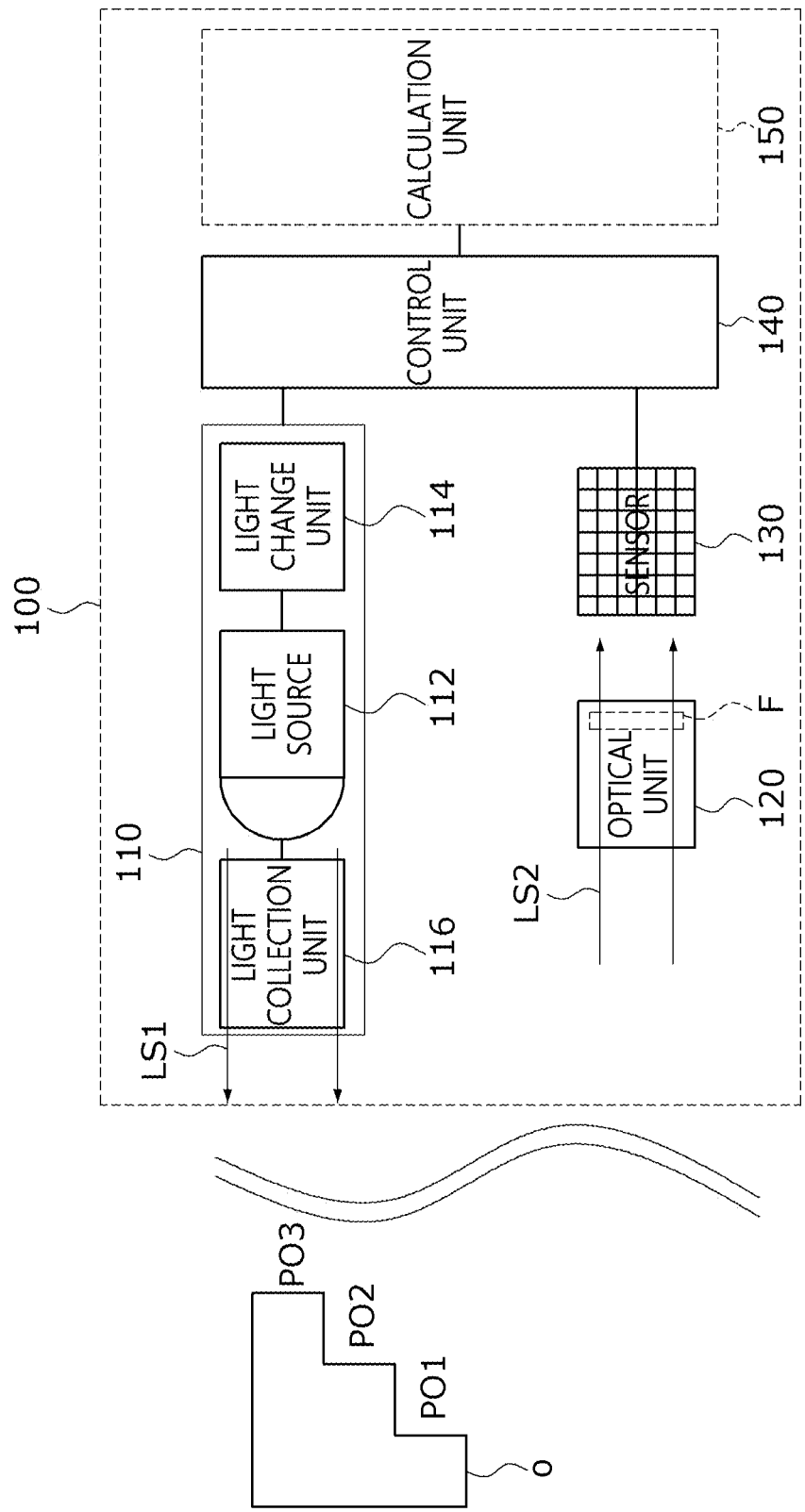

[Fig.2]
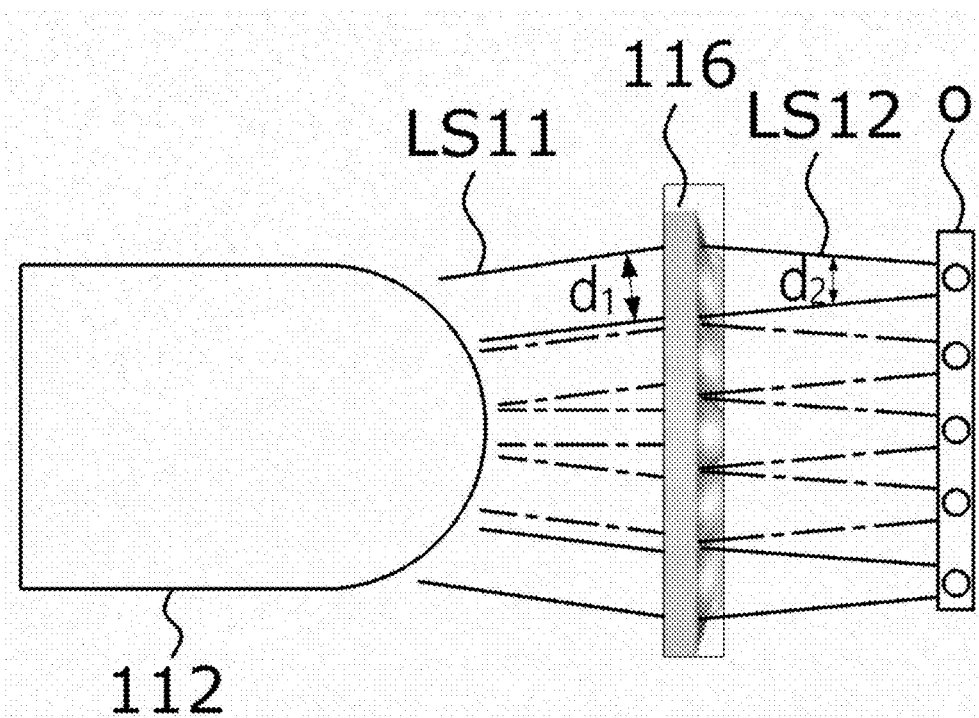

[Fig.3]
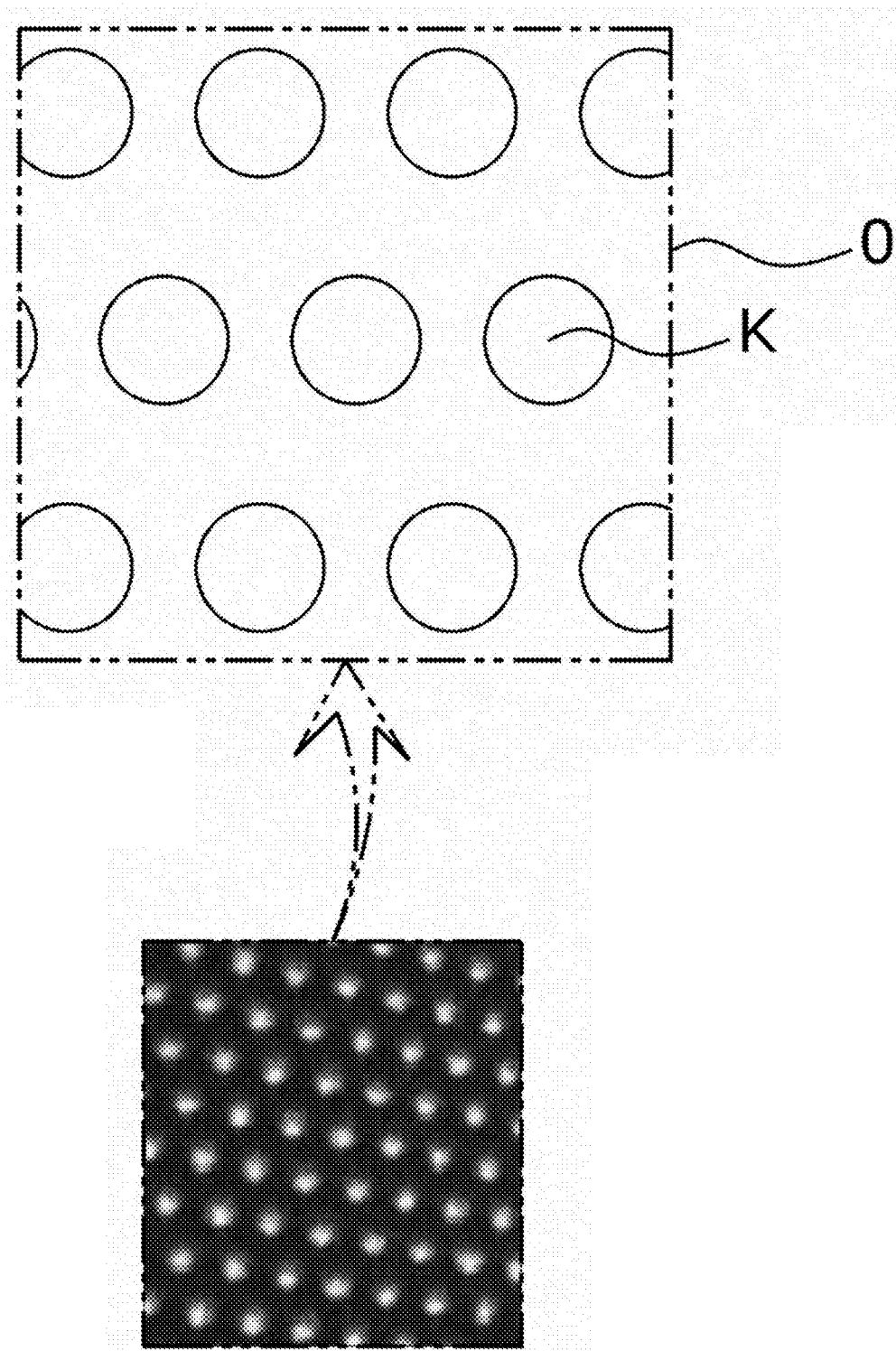

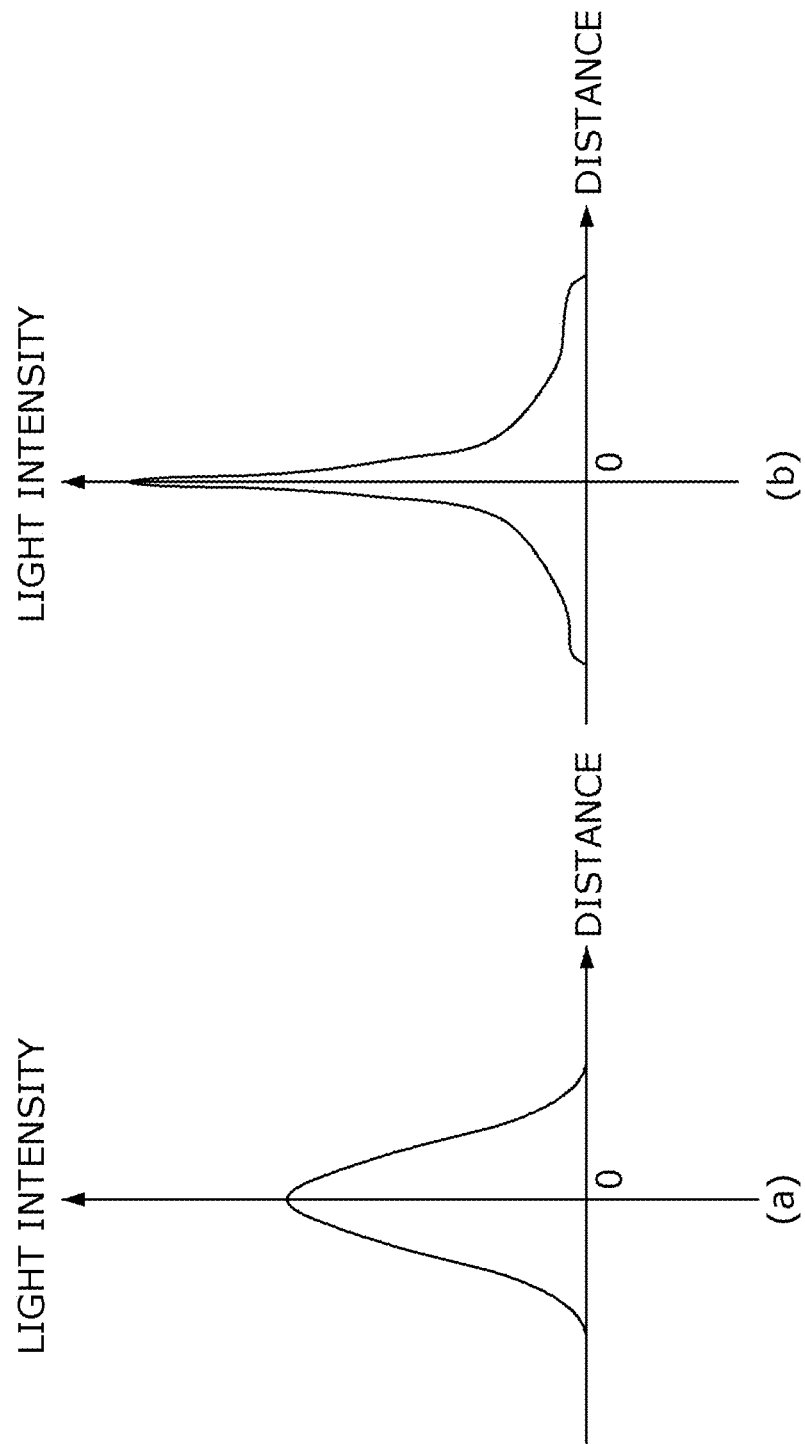

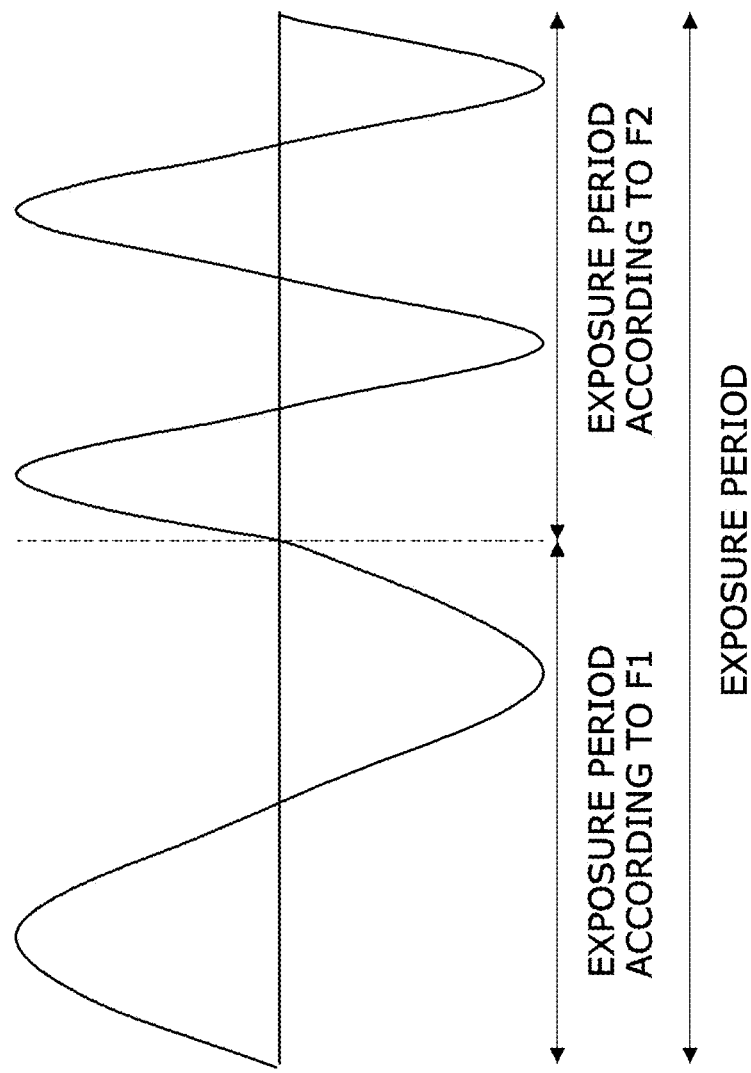
[Fig.5]

[Fig.6]
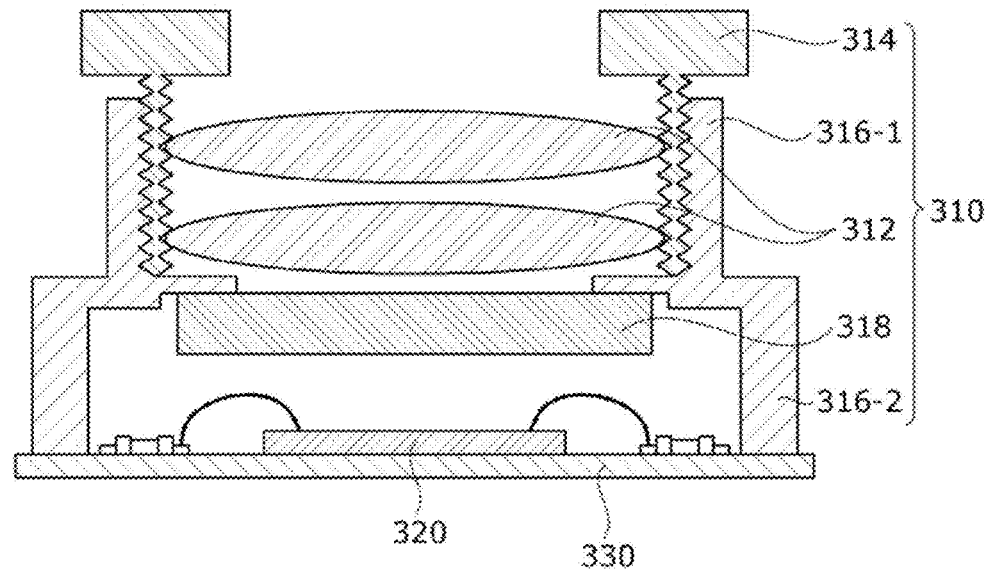
[Fig.7]
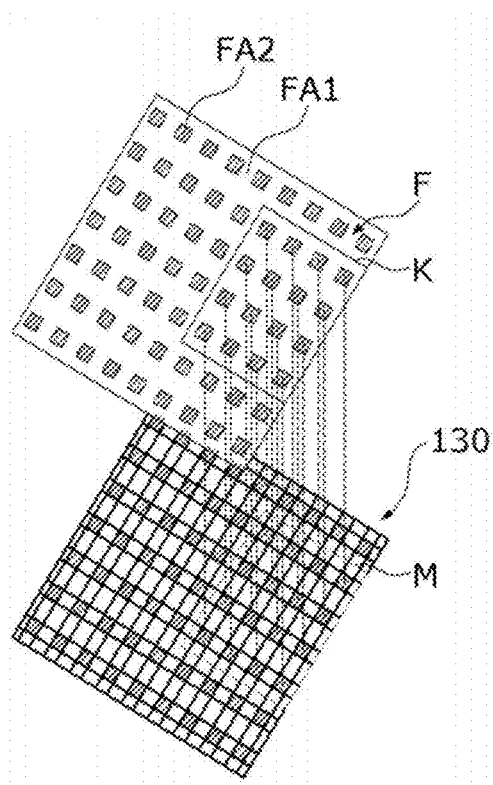

[Fig.8]
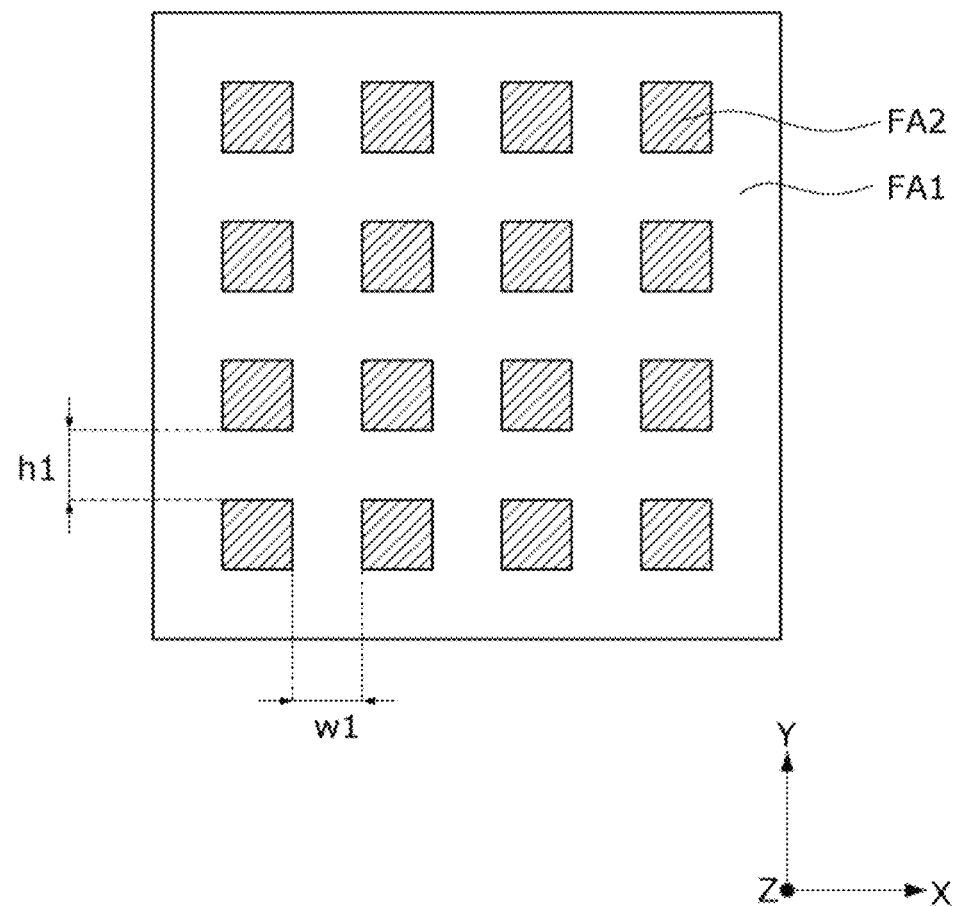

[Fig.9]
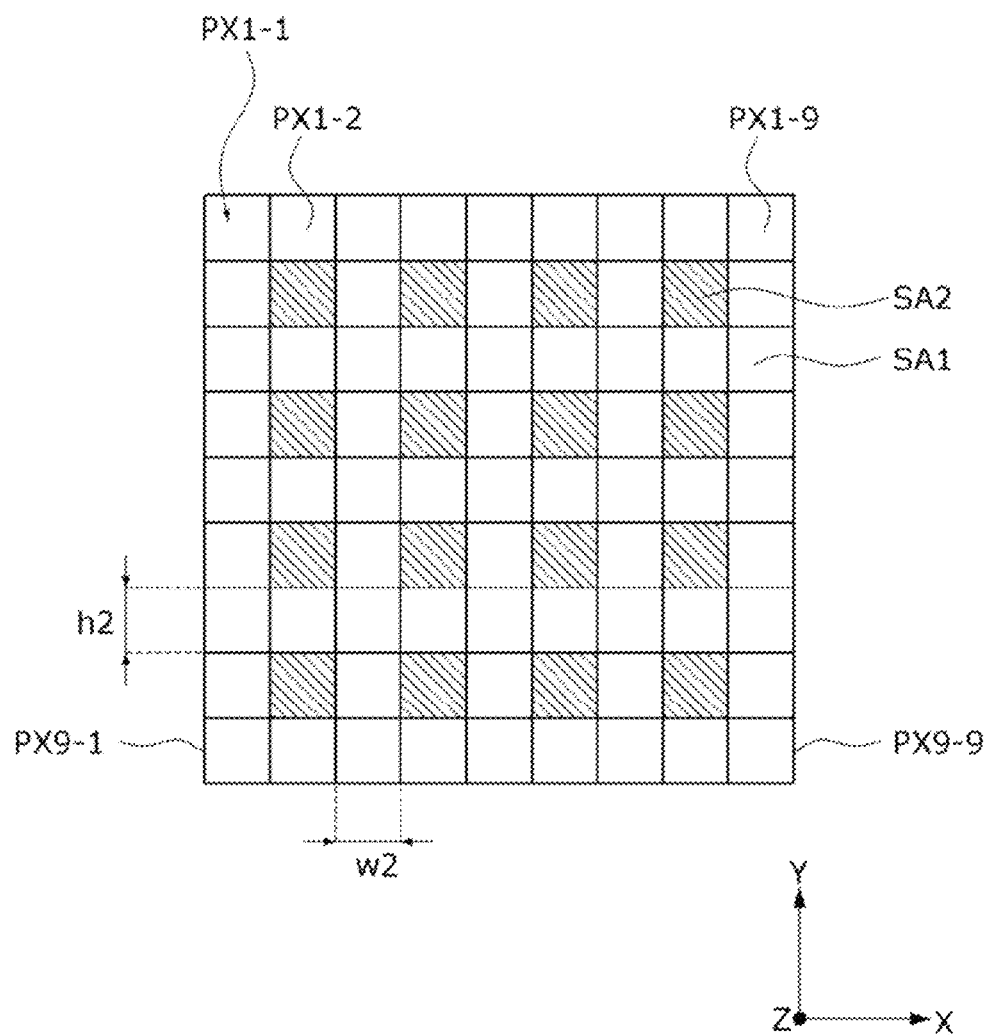

[Fig.10]
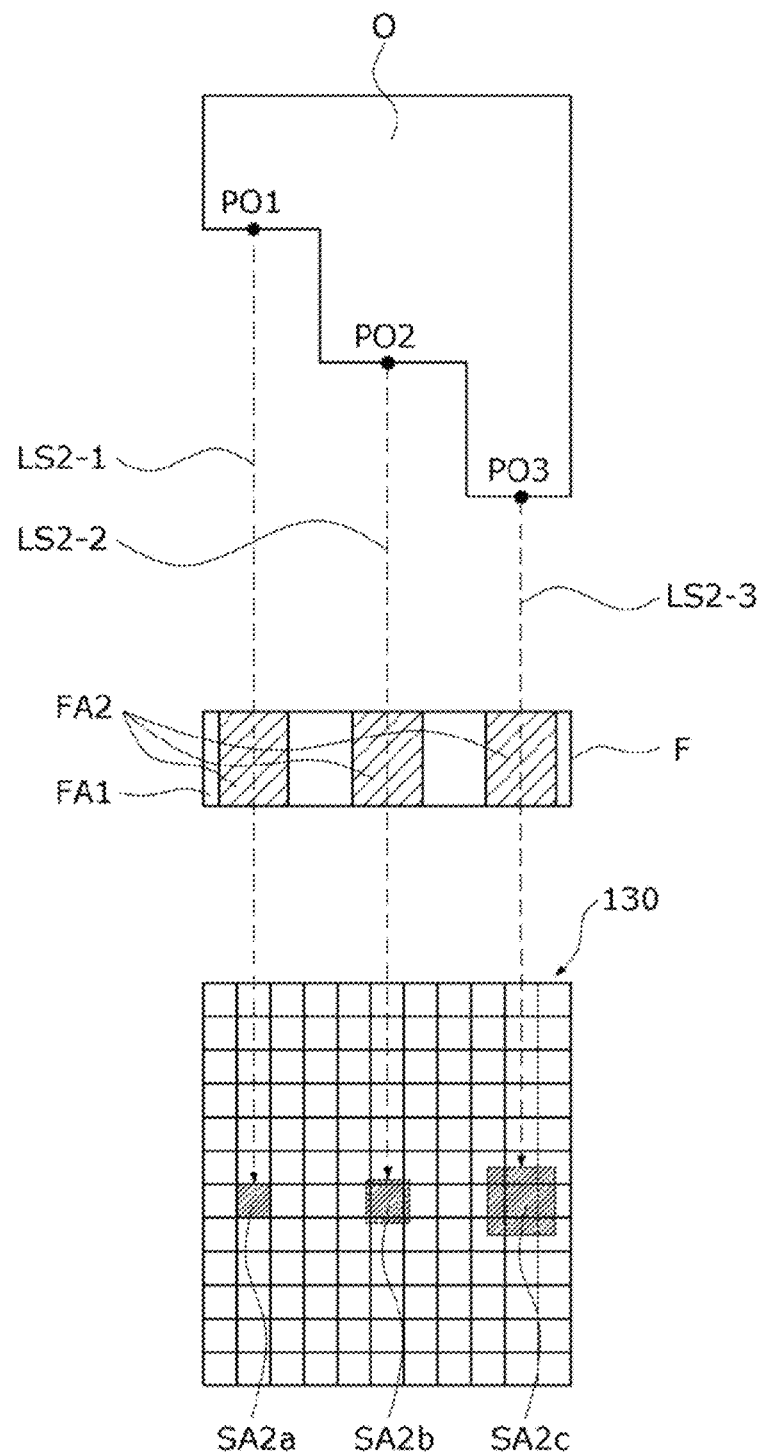

[Fig.11]
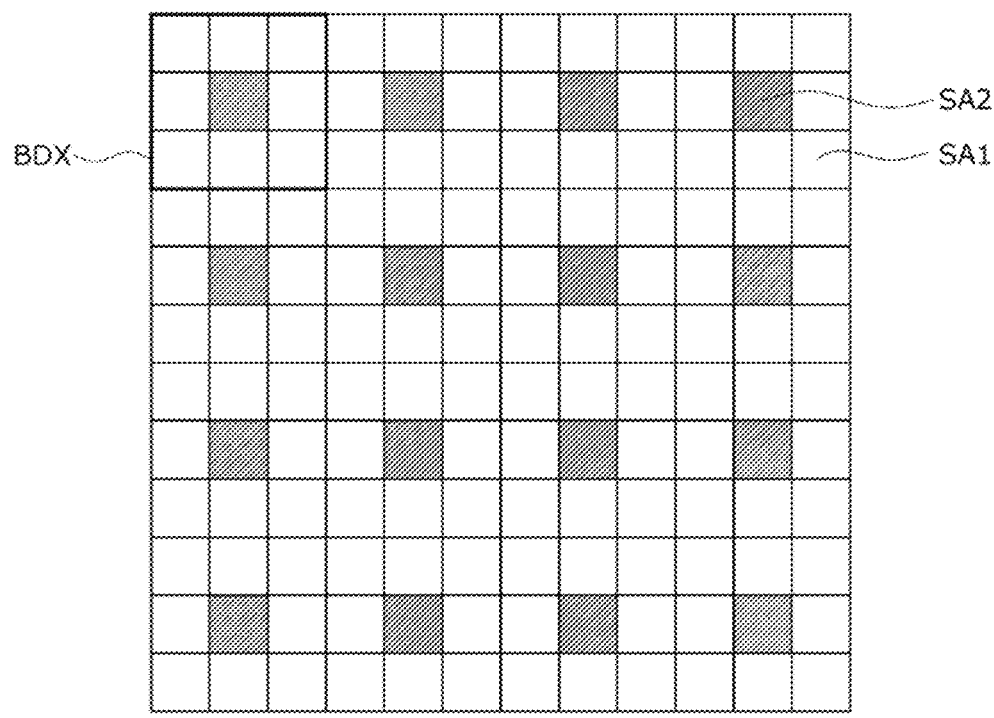

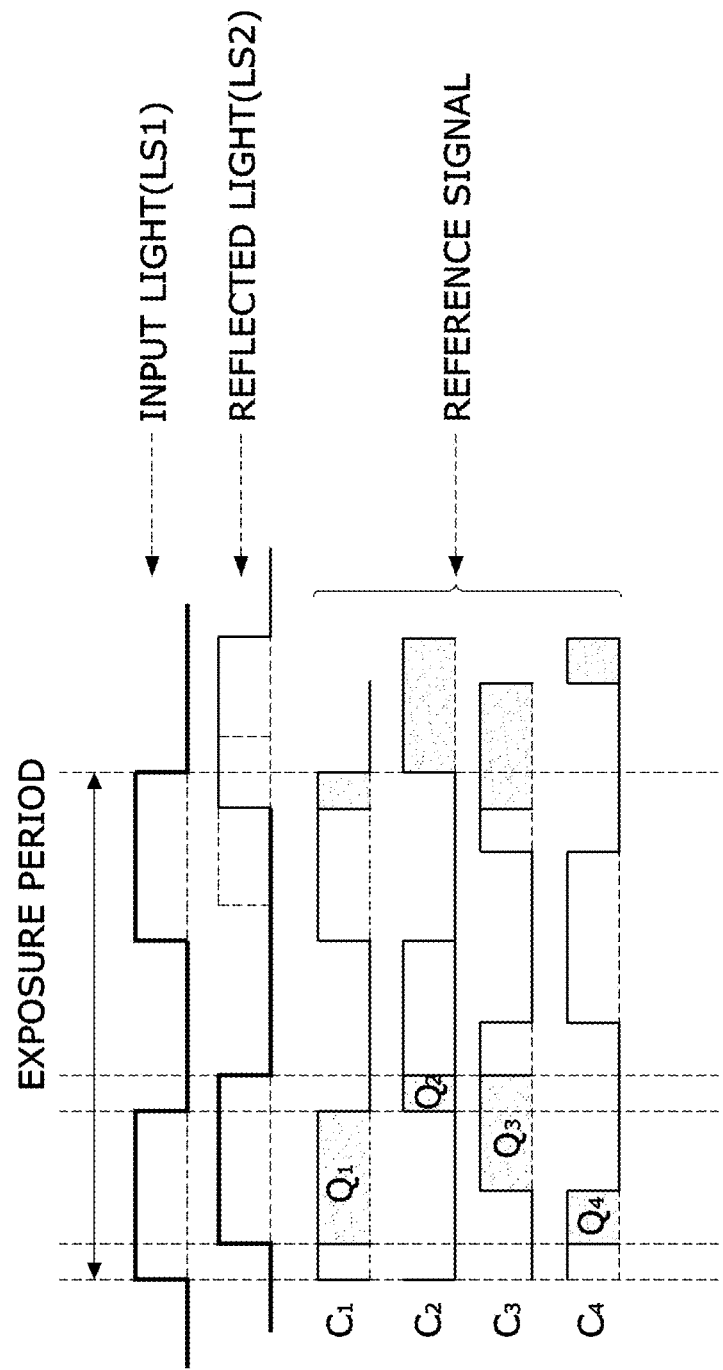

[Fig.13]
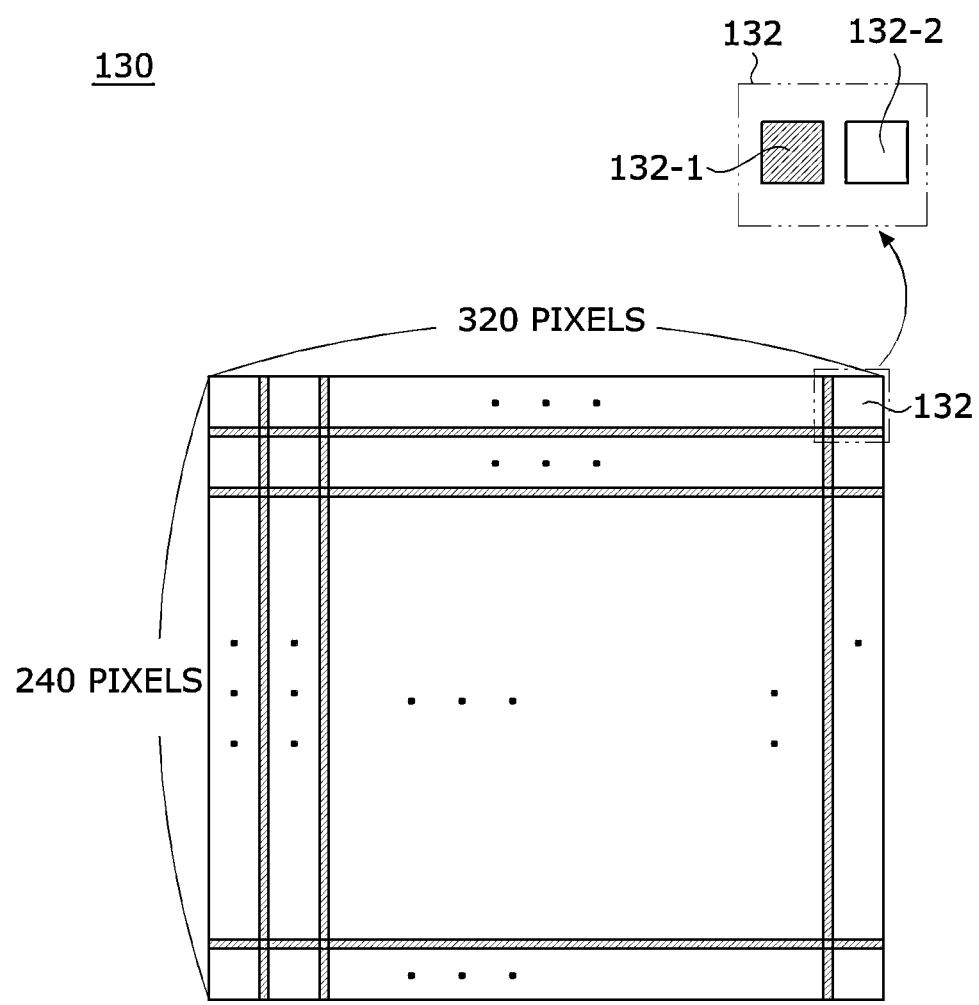

[Fig.14]
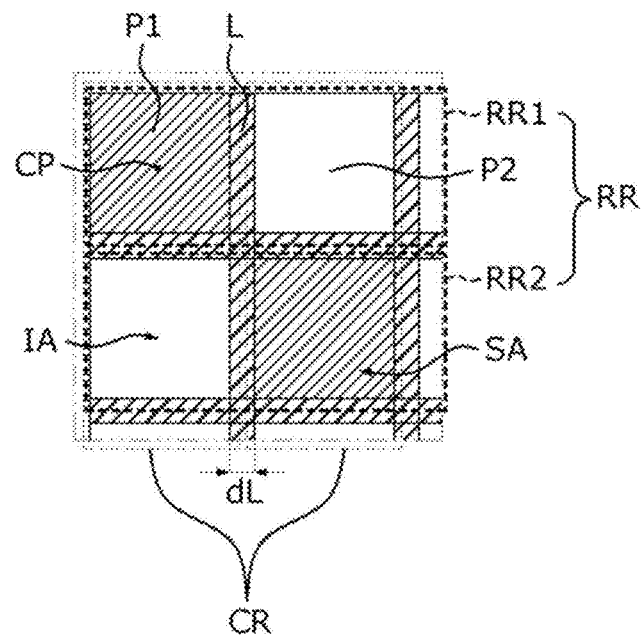
[Fig.15]
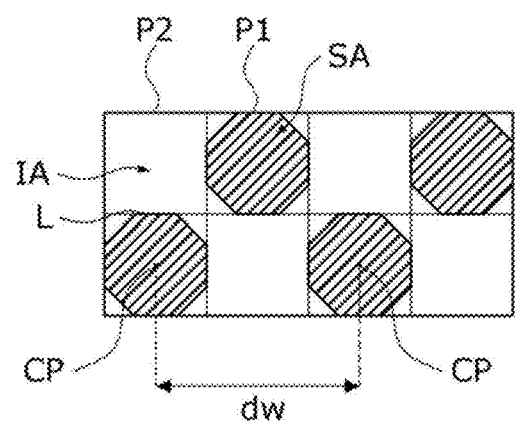

[Fig.16]
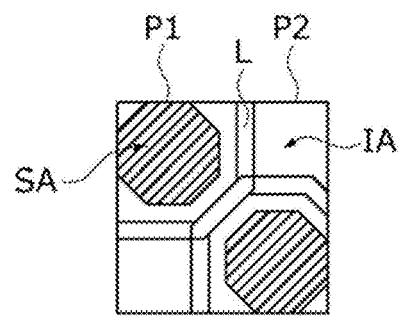
[Fig.17]
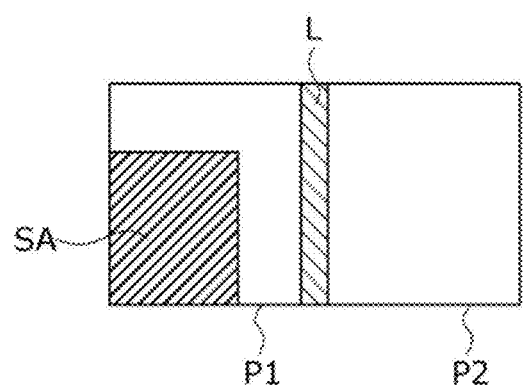

[Fig.18]
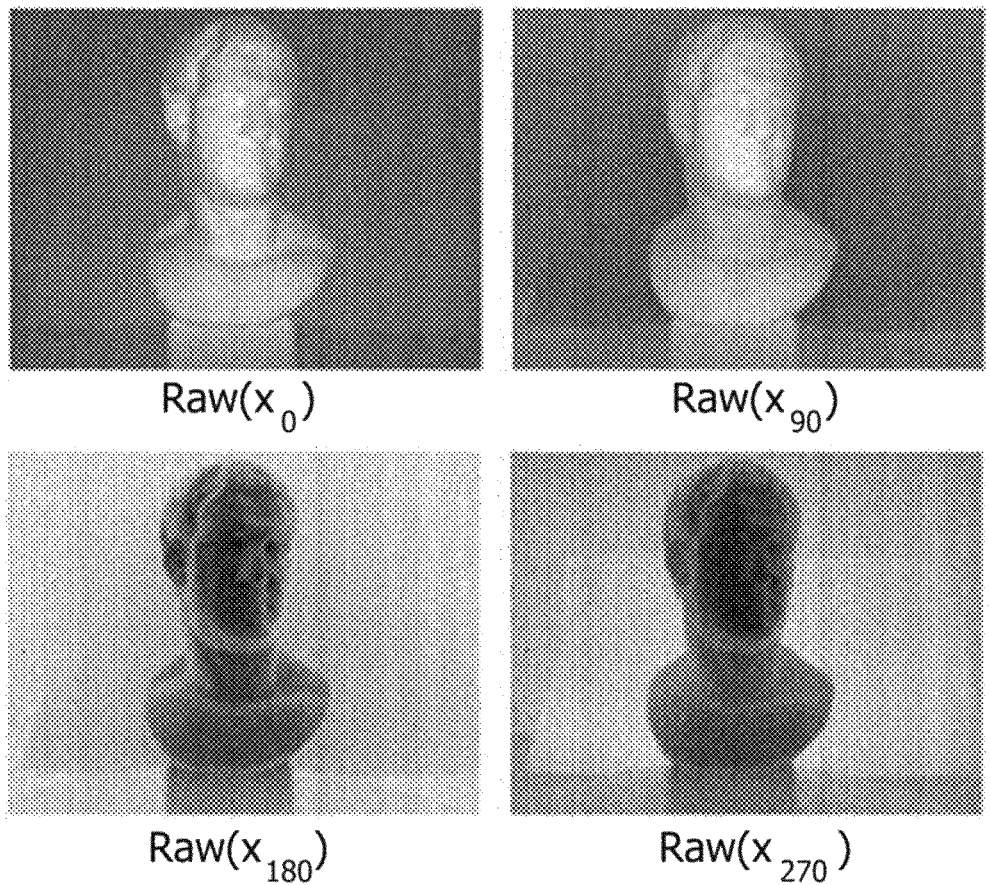

[Fig.19]

[Fig.20]
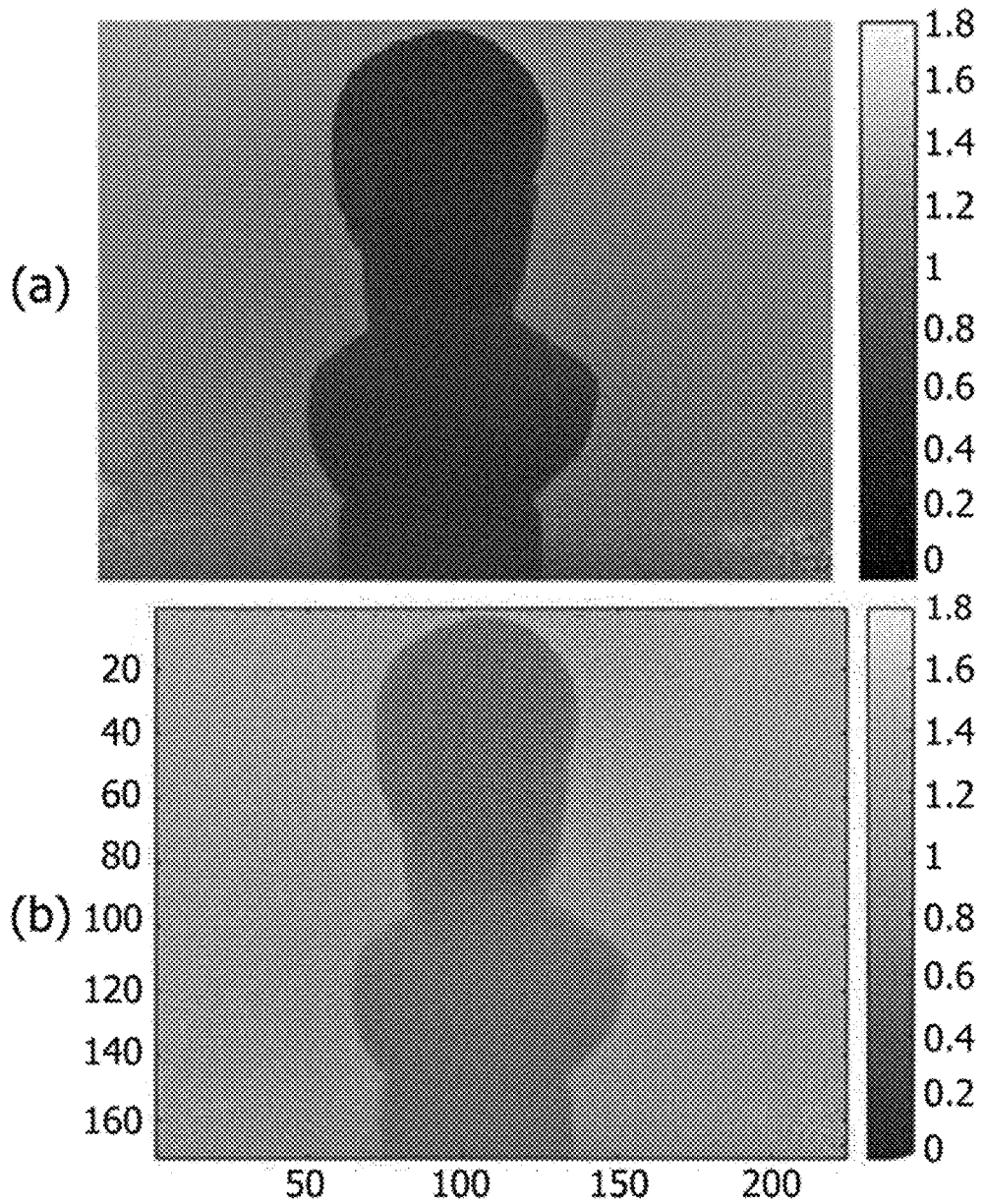

[Fig.21]
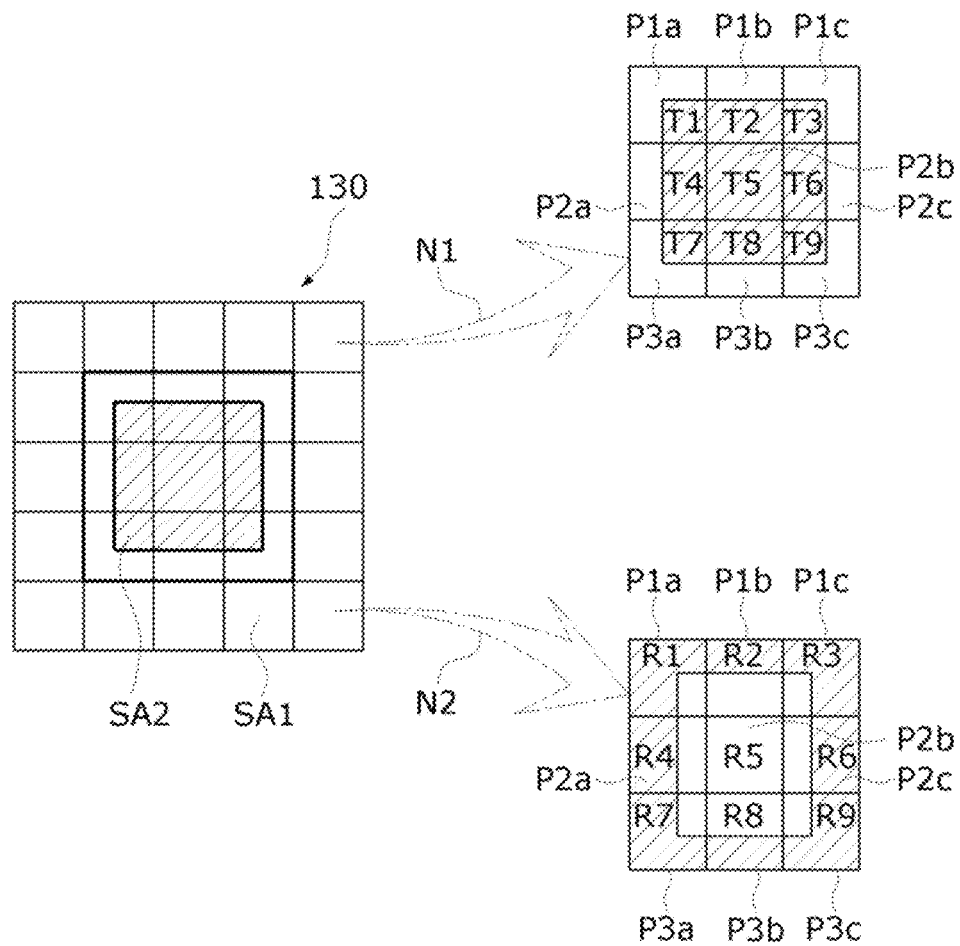
[Fig.22]
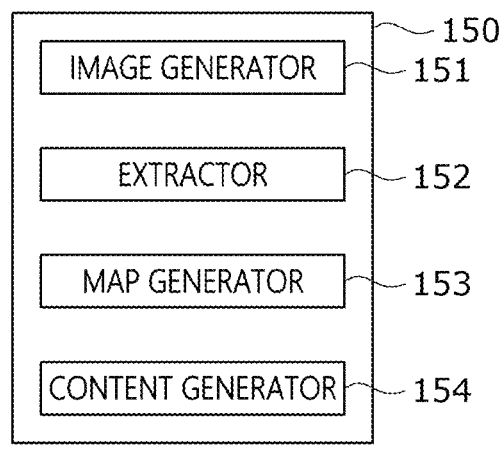

[Fig.23]
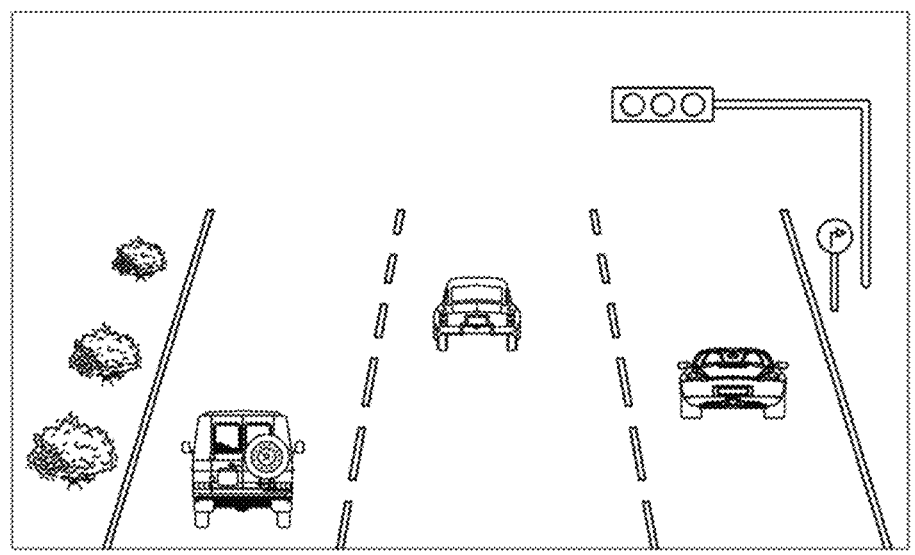
[Fig.24]
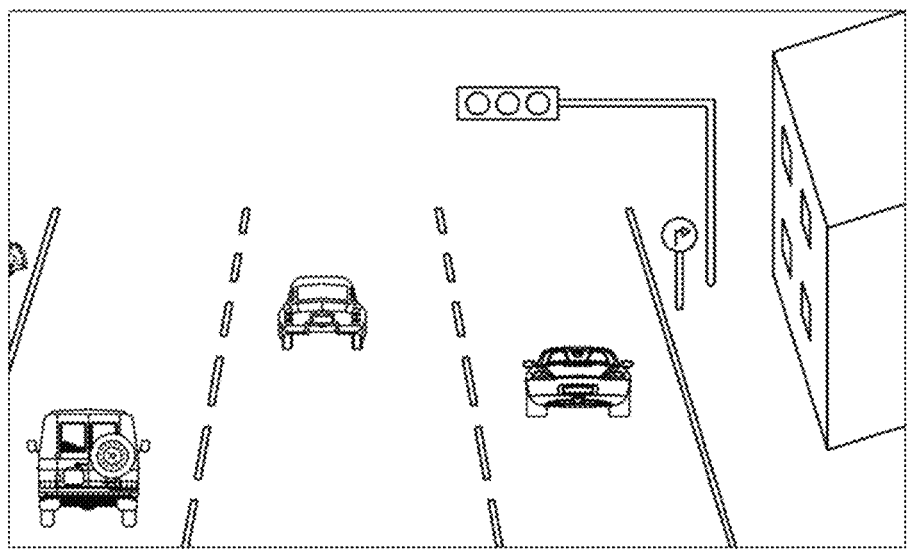

[Fig.25]
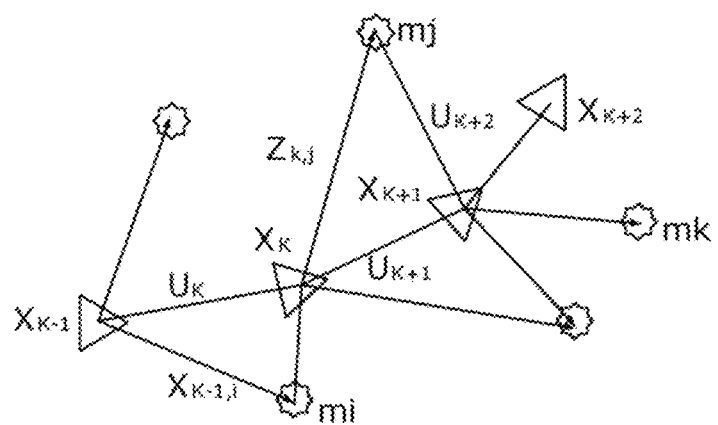

[Fig.26]
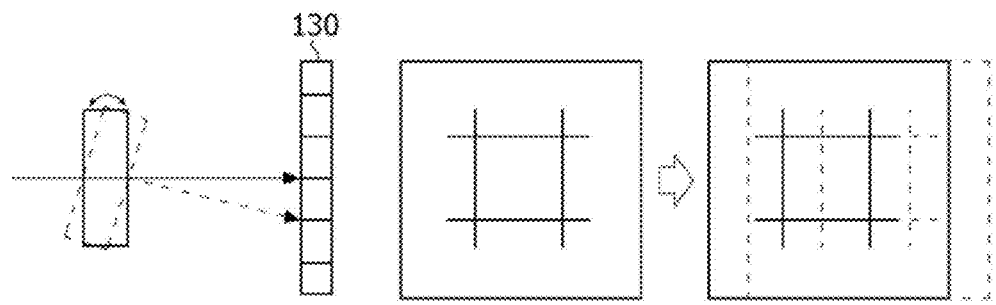
(a)
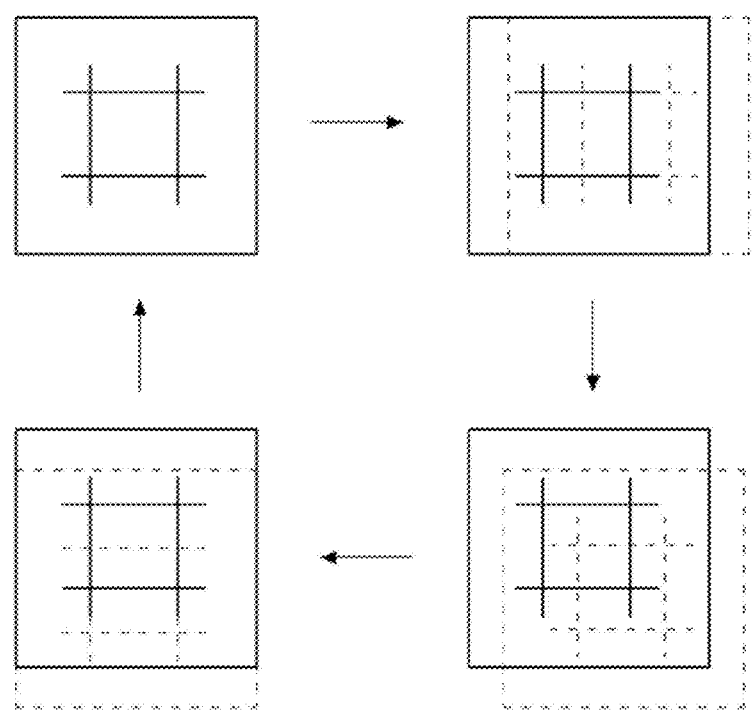
(b)

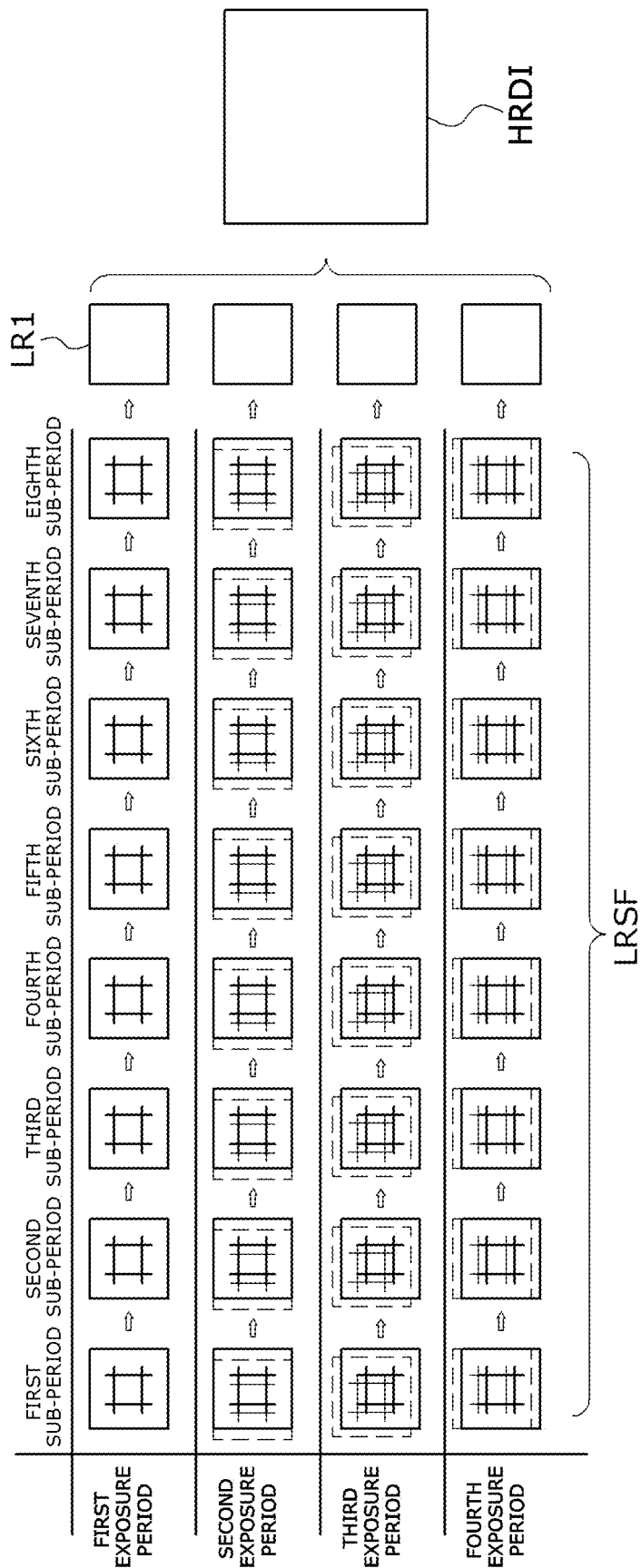
[Fig.27]

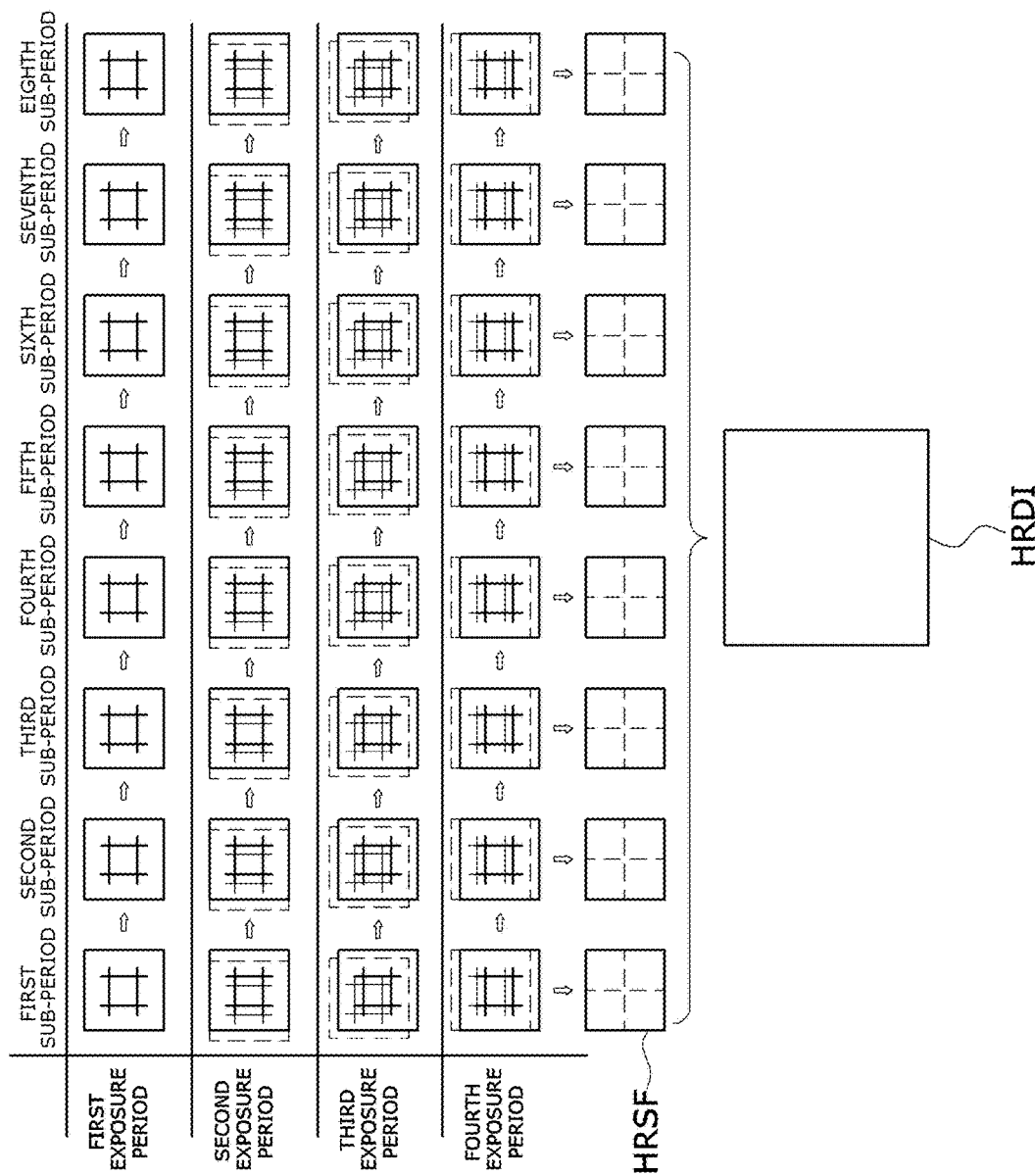

CAMERA MODULE

CROSS REFERENCE TO RELATED APPLICATIONS

This application is the National Phase of PCT International Application No. PCT/KR2020/005491, filed on Apr. 27, 2020, which claims priority under 35 U.S.C. 119(a) to Patent Application No. 10-2019-0049706, tiled in the Republic of Korea on Apr. 29, 2019, all of which are hereby expressly incorporated by reference into the present application.

TECHNICAL FIELD

The present invention relates to a camera module for extracting depth information.

BACKGROUND ART

Three-dimensional (3D) content is being applied in many fields such as education, manufacturing, and autonomous driving fields as well as game and culture fields, and depth information (depth map) is required to acquire 3D content. Depth information is information that indicates a spatial distance and refers to perspective information of a point with respect to another point in a two-dimensional image.

As methods of acquiring depth information, a method of projecting infrared (IR) structured light onto an object, a method using a stereo camera, a time-of-flight (TOF) method, and the like are being used. According to the TOF method, a distance to an object is calculated using information about light that is emitted and reflected. The greatest advantage of the ToF method is that distance information about a 3D space is quickly provided in real time. In addition, accurate distance information may be acquired without a user applying a separate algorithm or performing hardware correction. Furthermore, accurate depth information may be acquired even when a very close subject is measured or a moving subject is measured.

However, there is a limitation in that a processing speed is high in sorting and correcting depth information and color information. In addition, there is a problem in that accuracy is lowered when a distance to an object is increased.

DISCLOSURE

Technical Problem

The present invention is directed to providing a camera module which extracts depth information using a time-of-flight (TOF) method.

The present invention is also directed to providing a camera module which generates three-dimensional content at a high processing speed through distance information of a partial area acquired from an image sensor.

The present invention is also directed to providing a camera module capable of easily generating a depth map even when a distance is increased.

Technical Solution

According to an exemplary embodiment of the present invention, a camera module includes an optical output unit configured to output an optical signal to an object, a filter configured to allow an optical signal reflected by the object to pass therethrough, a sensor configured to receive the passed optical signal, and a control unit configured to acquire depth information of the object and color information of the object adjacent to the depth information of the object using the optical signal received by the sensor, wherein the filter includes a first filter area through which a first wavelength band as a pass band passes and a second filter area through which a second wavelength band different from the first wavelength band as a pass band passes, the sensor includes a first sensing area for receiving a first signal and a second sensing area for receiving a second signal, the control unit acquires the color information of the object from the first sensing area and acquires the depth information of the object from the second sensing area, the first signal is an optical signal that passes through the first filter area, and the second signal is an optical signal that passes through the second filter area.

The first filter area may surround the second filter area, and the first sensing area may surround the first sensing area.

The second sensing area may be provided as a plurality of second sensing areas spaced apart from each other.

The adjacent second sensing areas have the same distance in a row direction or a column direction.

Each of the second sensing areas may include a plurality of pixels of which at least portions are disposed in contact with each other.

The optical output unit may include a light collection unit configured to output the optical signal in a form of a plurality of arrays.

The camera module may further include a calculation unit configured to output three-dimensional content for the object using the acquired color information of the object and the acquired depth information of the object.

The calculation unit may include an image generator configured to generate a plurality of images using the acquired color information of the object and the acquired depth information of the object, an extractor configured to extract a feature point of each of the plurality of images, a map generator configured to generate a depth map using the feature point, and a content generator configured to generate the three-dimensional content by applying the depth map to the plurality of images.

The feature point may correspond to a position of the acquired depth information of the object.

The sensor may include an effective area in which a light-receiving element is disposed and an non-effective area other than the effective area and may include a first row area in which the effective area and the non-effective area are alternately disposed in a row direction and a second row area in which the effective area and the non-effective area are alternately disposed in the row direction and the effective area is disposed at a position that does not overlap the effective area of the first row area in a column direction.

The first sensing area and the second sensing area may overlap the effective area.

A width of the second sensing area may be changed according to a distance between the object and the optical output unit.

Advantageous Effects

According to one exemplary embodiment of the present invention, it is possible to easily output three-dimensional content through distance information of a partial area of an image acquired from an image sensor.

In addition, even when a distance is increased, the accuracy of distance recognition can be improved.

Furthermore, matching between color information and distance information is facilitated, thereby improving a processing speed for generating three-dimension content.

In addition, without significantly increasing the number of pixels of a sensor, depth information can be acquired at high resolution by shifting an optical path of an incident optical signal.

Furthermore, it is possible to provide a camera module in which an amount of processed data is reduced by easily calculating depth information.

DESCRIPTION OF DRAWINGS

FIG. 1 shows conceptual diagrams illustrating a camera module according to an exemplary embodiment.

FIG. 2 is a diagram illustrating an optical output unit according to an exemplary embodiment.

FIG. 3 shows diagrams illustrating one surface of an object in FIG. 2.

FIG. 4 shows graphs for describing an effect of light intensity according to a distance of an optical output unit according to an exemplary embodiment.

FIG. 5 is a diagram for describing a frequency of an optical signal according to an exemplary embodiment.

FIG. 6 is a cross-sectional view of a camera module according to an exemplary embodiment.

FIG. 7 shows conceptual diagrams of a filter and a sensor according to an exemplary embodiment.

FIG. 8 is an enlarged diagram of portion K in FIG. 7.

FIG. 9 is an enlarged diagram of portion M in FIG. 7.

FIG. 10 shows diagrams illustrating a second area of a sensor according to a distance to an object.

FIG. 11 is a plan view of a sensor according to a modified example.

FIG. 12 is a diagram for describing a process of generating an electrical signal in a sensor according to an exemplary embodiment.

FIG. 13 is a diagram for describing a sensor according to an exemplary embodiment.

FIGS. 14 to 17 are diagrams for describing various modified examples of a sensor.

FIG. 18 shows raw images for four phases acquired from a camera module according to an exemplary embodiment.

FIG. 19 shows an amplitude image acquired from a camera module according to an exemplary embodiment.

FIG. 20 shows depth images acquired from a camera module according to an exemplary embodiment.

FIG. 21 shows diagrams for describing an operation of obtaining depth information and color information in a camera module according to an exemplary embodiment.

FIG. 22 is a block diagram of a calculation unit according to an exemplary embodiment.

FIGS. 23 to 25 are diagrams for describing an image control method in a camera module according to an exemplary embodiment.

FIGS. 26 to 28 are diagrams for describing a control method for acquiring high resolution in a camera module according to an exemplary embodiment.

MODES OF THE INVENTION

Hereinafter, exemplary embodiments of the present invention will be described in detail with reference to the accompanying drawings.

However, the technical spirit of the present invention is not limited to some exemplary embodiments disclosed below but can be implemented in various different forms. Without departing from the technical spirit of the present invention, one or more of components may be selectively combined and substituted to be used between the exemplary embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate exemplary embodiments but are not intended to limit the present invention.

In the present specification, the terms expressed in the singular form may include the plural form unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the exemplary embodiments of the present invention.

Each of the terms is not used to define an essence, order, or sequence of a corresponding component but used merely to distinguish the corresponding component from other components.

In a case in which one component is described as being "connected," "coupled," or "Joined" to another component, such a description may include both a case in which one component is "connected," "coupled," and "joined" directly to another component and a case in which one component is "connected," "coupled," and "Joined" to another component with still another component disposed between one component and another component.

In addition, in a case in which any one component is described as being formed or disposed "on (or under)" another component, such a description includes both a case in which the two components are formed to be in direct contact with each other and a case in which the two components are in indirect contact with each other such that one or more other components are interposed between the two components. In addition, in a case in which one component is described as being formed "on (or under)" another component, such a description may include a case in which the one component is formed at an upper side or a lower side with respect to another component.

A camera module according to an exemplary embodiment to be described below may be used as an optical device or a part of the optical device. First, the optical device may include any one of a cellular phone, a mobile phone, a smartphone, a portable smart device, a digital camera, a laptop computes, a digital broadcasting terminal, a personal digital assistant (PDA), a portable multimedia player (PMP), and a navigation device. However, types of the optical device are not limited thereto, and any device for capturing an image or photo may be included in the optical device.

The optical device may include a main body. The main body may have a bar shape. Alternatively, the main body may have various structures such as a slide type, a folder type, a swing type, and a swivel type in which two or more sub-bodies are coupled to be relatively movable. The main body may include a case (casing, housing, or cover) forming an exterior. For example, the main body may include a front case and a rear case. Various electronic components of the optical device may be embedded in a space formed between the front case and the rear case.

The optical device may include a display. The display may be disposed on one surface of the main body of the optical device. The display may output an image. The display may output an image captured by a camera.

The optical device may include a camera. The camera may include a time-of-flight (ToF) camera module. The ToF camera module may be disposed on a front surface of the main body of the optical device. In this case, the ToF camera module may be used for various types of biometric recognition such as face recognition, iris recognition, and vein recognition of a user for security authentication of the optical device.

FIG. 1 shows conceptual diagrams illustrating a camera module according to an exemplary embodiment.

Referring to FIG. 1, a camera module 100 according to the exemplary embodiment may include an optical output unit 110, an optical unit 120, a sensor 130, a control unit 140, and a calculation unit 150.

The optical output unit 110 may generate and irradiate light toward an object O in a desired signal form. Specifically, the optical output unit may be a light-emitting module, a light-emitting unit, a light-emitting assembly, or a light-emitting device. Specifically, the optical output unit 110 may generate an optical signal and then irradiate the generated optical signal onto the object. In this case, the optical output unit 110 may generate and output an optical signal in the form of a pulse wave or a continuous wave. The continuous wave may be in the form of a sinusoid wave or a square wave. When the optical output unit 110 generates an optical signal in the form of a pulse wave or a continuous wave, the camera module 100 may use a phase difference or a time difference between the optical signal output from the optical output unit 110 and an input optical signal reflected from the object and then input to the camera module 100. In the present specification, output light LS1 refers to light that is output from the optical output unit 110 and incident on the object, and input light LS2 refers to light in which output light output from the optical output unit 110 reaches the object to be reflected from the object and then is input to the camera module 100. From the point of view of the object, the output light LS1 may be incident light, and the input light LS2 may be reflected light.

The optical output unit 110 irradiates the generated optical signal onto an object for a predetermined exposure period (integration time). Here, the exposure period refers to one frame period. When a plurality of frames are generated, a set exposure period is repeated. For example, when the camera module 100 photographs the object at 20 frames per second (FPS), an exposure period is 1/20 [sec]. When 100 frames are generated, an exposure period may be repeated 100 times.

The optical output unit 110 may generate not only an output optical signal having a predetermined frequency but also a plurality of optical signals having different frequencies. In addition, the optical output unit 110 may sequentially and repeatedly output a plurality of optical signals having different frequencies. Alternatively, the optical output unit 110 may simultaneously output a plurality of optical signals having different frequencies.

For such an operation, in an exemplary embodiment, the optical output unit 110 may include a light source 112, a light change unit 114, and a light collection unit 116.

First, the light source 112 may generate light. The light generated by the light source 112 may be infrared light having a wavelength of 770 nm to 3,000 nm or may be visible light having a wavelength of 380 nm to 770 nm. The light source 112 may include a light-emitting diode (LED) and may have a form in which a plurality of LEDs are arranged according to a certain pattern. In addition, the light source 112 may also include an organic light-emitting diode (OLED) or a laser diode (LD). Alternatively, the light source 112 may also be a vertical cavity surface emitting laser (VCSEL). The VCSEL may be one of laser diodes which convert an electrical signal into an optical signal and may use a wavelength of about 800 nm to 1,000 nm, for example, a wavelength of about 850 nm or about 940 nm.

The light source 112 is repeatedly turned on/off at a certain time interval to generate an optical signal in the form of a pulse wave or a continuous wave. The certain time interval may be a frequency of an optical signal. Turn-on/off of the light source 112 may be controlled by the light change unit 114.

The light change unit 114 controls turn-on/off of the light source 112 and controls the light source 112 to generate an optical signal in the form of a continuous wave or a pulse wave. The light change unit 114 may control the light source 112 to generate an optical signal in the form of a continuous wave or a pulse wave through frequency modulation, pulse modulation, or the like.

The light collection unit 116 may change an optical path such that light generated from the light source 112 has an array spot. For example, the light collection unit 116 may include an imaging lens, a micro lens array, or a diffractive optical element (DOE). Due to such a configuration, light emitted toward the object O from the camera module 100 may have a plurality of array spots. Thus, even when a distance between the camera module 100 and the object O is increased, light emitted from the camera module 100 may easily reach the object O due to being collected. Accordingly, the camera module 100 according to the exemplary embodiment may enable longer-distance light transmission. In this case, the number of the array spots can be variously set, and the configuration and effects of the light collection unit 116 will be described in detail below.

Meanwhile, the optical unit 120 may include at least one lens. The optical unit 120 may collect an input optical signal reflected from the object through at least one lens to transmit the collected optical signal to the sensor 130. At least one lens of the optical unit 120 may include a solid lens. In addition, at least one lens may include a variable lens. The variable lens may be a focus-variable lens. In addition, the variable lens may be a focus-adjustable lens. Furthermore, the variable lens may be at least one of a liquid lens, a polymer lens, a liquid crystal lens, a voice coil motor (VCM) type, and a shape memory (SMA) type. The liquid lens may include a liquid lens including one type of liquid and a liquid lens including two types of liquids. In the liquid lens including one type of liquid, a focus may be varied by adjusting a membrane disposed at a position corresponding to the liquid, and for example, the focus may be varied by pressing the membrane with an electromagnetic force of a magnet and a coil. The liquid lens including two types of liquids may include a conductive liquid and a non-conductive liquid, and an interface formed between the conductive liquid and the non-conductive liquid may be adjusted using a voltage applied to the liquid lens. In the polymer lens, a focus may be varied by controlling a polymer material through a piezo-driver or the like. In the liquid crystal lens, a focus may be varied by controlling a liquid crystal with an electromagnetic force. In the VCM type, a focus may be varied by controlling a solid lens or a lens assembly including a solid lens through an electromagnetic force between a magnet and a coil. In the SMA type, a focus may be varied by controlling a solid lens or a lens assembly including a solid lens using a shape memory alloy. In addition, the optical unit 120 may include an optical plate. The optical plate may be a light transmitting plate.

In addition, the optical unit 120 may include a filter F that transmits light in a specific wavelength range. In an exemplary embodiment, the filter F of the optical unit 120 may transmit only light in a preset wavelength region and may block light other than light in the preset wavelength region. In this case, the filter F may allow light in an infrared (IR) region to partially pass therethrough. For example, the filter F may include an IR band pass filter that allows light having a wavelength of 780 nm to 1,000 nm to partially pass therethrough. A detailed description thereof will be provided below.

The sensor 130 may generate an electrical signal using an input optical signal that is collected through the optical unit 120. In an exemplary embodiment, the sensor 130 may absorb an input optical signal in synchronization with an on/off period of the optical output unit 110. Specifically, the sensor 130 may absorb light in each of an in-phase and an out-phase with an optical signal output from the optical output unit 110.

In addition, the sensor 130 may generate an electrical signal corresponding to each reference signal using a plurality of reference signals having different phases. For example, the electrical signal may be a signal obtained by mixing each reference signal and input light, and the mixing may include convolution, multiplication, or the like. In addition, a frequency of the reference signal may be set to correspond to a frequency of an optical signal output from the optical output unit 110. In an exemplary embodiment, the frequency of the reference signal may be the same as the frequency of the optical signal of the optical output unit 110.

As described above, when the optical output unit 110 generates an optical signal with a plurality of frequencies, the sensor 130 may generate an electrical signal using a plurality of reference signals corresponding to each frequency. The electrical signal may include information about an electric charge amount or a voltage which corresponds to each reference signal. In addition, the electrical signal may be calculated for each pixel.

The control unit 140 may control the optical unit 120 to shift an optical path of an input optical signal. Due to such a configuration, as will be described below, it is possible to output a plurality of pieces of image data for extracting a high resolution depth image. A detailed description thereof will be provided below.

In addition, the calculation unit 150 may use the electrical signal received from the sensor 130 and combine the plurality of pieces of image data extracted from the control unit 140 to calculate depth information having high resolution that is higher than that of the image data. In addition, the calculation unit 150 may be disposed in an optical device including the camera module or in the camera module 100 as shown to perform calculation. Hereinafter, description will be provided based on the calculation unit 150 being disposed in the camera module 100.

The calculation unit 150 may receive information sensed by the sensor 130 from the camera module 100 to perform calculation thereon. The calculation unit 150 may receive a plurality of pieces of low resolution information using the electrical signal received from the sensor 130 and generate high resolution depth information using the plurality of pieces of low resolution information. For example, the high resolution depth information may be generated by rearranging the plurality of pieces of low resolution information.

In this case, the calculation unit 150 may calculate a distance between the object and the camera module 100 using a time difference between an optical signal output from the optical output unit and an optical signal received by the sensor or using a plurality of pieces of information acquired during a plurality of integration times of the sensor, for which an effective area of the sensor is exposed in different phases.

The term "~unit" used in the present exemplary embodiment refers to a software or hardware component, such as a field-programmable gate array (FPGA) or an application-specific integrated circuit (ASIC), which executes certain tasks. However, the term "~unit" is not limited to the software or hardware component. A "~unit" may be included in an addressable storage medium and configured to operate one or more processors. Thus, a "~ unit" may include, by way of example, components such as software components, object-oriented software components, class components and task components, processes, functions, attributes, procedures, subroutines, segments of program code, drivers, firmware, microcode, circuitry, data, databases, database structures, tables, arrays, and parameters. The functionality provided in the components and "~ units" may be combined into fewer components and "~ units" or further separated into additional components and units. In addition, the components and units may be implemented such that the components and "~ units" operate one or more central processing units (CPUs) in a device or a security multimedia card.

FIG. 2 is a diagram illustrating an optical output unit according to an exemplary embodiment, FIG. 3 shows diagrams illustrating one surface of an object in FIG. 2, and FIG. 4 shows graphs for describing an effect of light intensity according to a distance of an optical output unit according to an exemplary embodiment.

Referring to FIG. 2, as described above, light emitted from a light source 112 may pass through a light collection unit 116 to be irradiated onto an object O. In addition, the light irradiated onto the object O may be in the form of an array spot, and the light collection unit 116 may also be provided with imaging lenses arranged in an array form corresponding to the form. In this case, in the light collection unit 116, an interval d1 of light irradiated to each single lens may be different from an interval d2 of light passing through each single lens. Here, intervals of light may be measured in a front area and a rear area, which have the same interval in the light collection unit 116, of the light collection unit 116.

The interval d1 of light irradiated to each single lens may be greater than the interval d2 of light passing through each single lens. Due to such a configuration, even though a distance from the light source 112 to the object O is increased, a camera module can easily receive input light. In other words, the camera module according to the exemplary embodiment may easily perform depth measurement event though a distance to the object is long.

Referring to FIG. 3, light passing through the light collection unit 160 may be focused in the form of an array spot on the object O. In an exemplary embodiment, single spots K may be present in various array forms according to the shape of the imaging lens of the light collection unit 160. In an exemplary embodiment, each single spot K may be disposed to be spaced apart from an adjacent spot by a predetermined interval. Due to such a configuration, even though a distance to the object O is increased, pieces of depth information according to distances can be easily distinguished from each other. In other words, accuracy of depth information can be improved. In addition, the number of spots in the array spot can be variously changed.

Referring to FIGS. 4A and 4B, FIG. 4A shows light intensity when a light collection unit is not present, and FIG.

4B shows light intensity when a light collection unit is present. In this case, when the light collection unit is present and when the light collection unit is not present, light intensity may be greatest at a center 0 of a single spot. However, even though distances to an object are the same, light intensity at the center 0 of the single spot may be different according to the presence or absence of the light collection unit.

More specifically, since light intensity at the center of the single spot is increased by the light collection unit, a magnitude of an electrical signal converted by a sensor may also be increased according to the light intensity. It can be seen that a depth is also increased as a width of an electrical signal in the sensor is increased. Accordingly, accuracy of depth information according to a distance can be further improved. In addition, since light intensity at the center of the spot is increased by the light collection unit even when a distance to an object is increased, it is possible to compensate for a decrease in light intensity according to the distance to the object.

FIG. 5 is a diagram for describing a frequency of an optical signal according to an exemplary embodiment.

Referring to FIG. 5, in an exemplary embodiment, as shown in FIG. 5, an optical output unit 110 may perform control to generate an optical signal having a frequency f1 at a first half of an exposure period and may perform control to generate an optical signal having a frequency f2 at the other half of the exposure period.

According to another exemplary embodiment, the optical output unit 110 may control some LEDs of a plurality of LEDs to generate the optical signal having the frequency f1 and may control the remaining LEDs to generate the optical signal having the frequency f2. As described above, the optical output unit 110 may generate output signals having different frequencies for each exposure period.

For example, optical signals may be generated at the frequencies f1 and f2, and a plurality of reference signals may have a phase difference of 90°. In this case, since incident optical signals also have the frequencies f1 and f2, a sensor to be described below may generate four electrical signals through an input optical signal having the frequency f1 and four reference signals corresponding thereto. The sensor may generate four electrical signals through an input optical signal having the frequency f1 and four reference signals corresponding thereto. Thus, the sensor may generate a total of eight electrical signals. However, as described above, an optical signal may be generated with one frequency (for example, f1).

FIG. 6 is a cross-sectional view of a camera module according to an exemplary embodiment.

Referring to FIG. 6, the camera module according to the exemplary embodiment may include a lens assembly 310, a sensor 320, and a printed circuit board 330. Here, the lens assembly 310 may correspond to the optical unit 120 of FIG. 1, and the sensor 320 may correspond to the sensor 130 of FIG. 1. The control unit 140 of FIG. 1 may be implemented on the printed circuit board 330 or the sensor 320. Although not shown, the optical output unit 110 of FIG. 1 may be disposed on the printed circuit board 330 or may be disposed as a separate component. The optical output unit 110 may be controlled by the control unit 140.

The lens assembly 310 may include a lens 312, a lens barrel 314, a lens holder 316, and an IR filter 318.

The lens 312 may be provided as a plurality of lens or may be provided as one lens. When the lens 312 is provided as the plurality of lenses, respective lenses may be arranged with respect to a central axis thereof to form an optical system. Here, the central axis may be the same as an optical axis of the optical system. The lens 312 may include the above-described variable lens.

The lens barrel 314 is coupled to the lens holder 316, and a space for accommodating the lens may be formed therein. Although the lens barrel 314 may be rotatably coupled to the one lens or the plurality of lenses, this is merely an example, and the lens barrel 314 may be coupled through other methods such as a method using an adhesive (for example, an adhesive resin such as an epoxy).

The lens holder 316 may be coupled to the lens barrel 314 to support the lens barrel 314 and may be disposed on the printed circuit board 330 on which the sensor 320 is mounted. A space in which the IR filter 318 may be disposed may be formed in the lens barrel 314 due to the lens holder 316. Although not shown, a driver capable of tilting or shifting the IR barrel 314 under control of the control unit 140b may be disposed in the lens barrel 314. A spiral pattern may be formed on an inner circumferential surface of the lens holder 316, and the lens holder 316 may be rotatably coupled to the lens barrel 314 in which a spiral pattern is similarly formed on an outer circumferential surface thereof. However, this is merely an example, and the lens holder 316 and the lens barrel 314 may be coupled through an adhesive, or the lens holder 316 and the lens barrel 314 may be integrally formed.

The lens holder 316 may be divided into an upper holder 316-1 coupled to the lens barrel 314 and a lower holder 316-2 disposed on the printed circuit board 330 on which the sensor 320 is mounted. The upper holder 316-1 and the lower holder 316-2 may be integrally formed, may be formed in separate structures and then connected or coupled, or may have structures that are separate and spaced apart from each other. In this case, a diameter of the upper holder 316-1 may be less than a diameter of the lower holder 316-2.

The above example is merely an exemplary embodiment, and the optical unit 120 may be formed in another structure capable of condensing an input optical signal incident to a ToF camera module 100 and transmitting the input optical signal to the sensor 130.

FIG. 7 shows conceptual diagrams of a filter and a sensor according to an exemplary embodiment, FIG. 8 is an enlarged diagram of portion K in FIG. 7, and FIG. 9 is an enlarged diagram of portion M in FIG. 7. FIG. 10 shows diagrams illustrating a second area of a sensor according to a distance to an object. FIG. 11 is a plan view of a sensor according to a modified example.

Referring to FIGS. 7 to 9, reflected light LS2 may pass through a filter F to finally be received by a sensor 130. In this case, the reflected light may be light having a predetermined wavelength band as described above, and a portion of light may be blocked by the filter F.

Specifically, the filter F may include a first filter area FA1 through which a first wavelength band as a pass band passes and a second filter area FA2 through which a second wavelength band, which is a band different from the first wavelength band, as a pass band passes. In other words, the filter F may be divided into the first filter area FA1 and the second filter area FA2.

In addition, in an exemplary embodiment, the second wavelength band may be the same as a wavelength band in which IR light is transmitted. Accordingly, since the second filter area F2 filters a wavelength region of IR light, the second filter area F2 may operate as a band pass filter with respect to IR light. On the other hand, the first wavelength band may include the second wavelength band or include a region excluding the second wavelength band. In an exemplary embodiment, the first wavelength band is a pass band which is a wavelength band excluding the second wavelength band, which will be mainly described below.

In this case, the first filter area FA1 may be disposed to surround the second filter area FA2. Specifically, the second filter area FA2 may be provided as a plurality of second filter areas FA2, and the plurality of second filter areas FA2 may be disposed in the filter F so as to be spaced apart from each other. In this case, the second filter areas FA2 may be spaced apart from each other by a predetermined interval. For example, widths W1 between adjacent second filter areas FA2 in a first direction (X-axis direction) may all be the same, and also, heights h1 between adjacent second filter areas FA2 in a second direction (Y-axis direction) may all be the same. Here, the first direction (X-axis direction) refers to one direction in which a plurality of pixels arranged in an array form in the sensor are arranged to be parallel, and the second direction (Y-axis direction) is a direction perpendicular to the first direction and refers to a direction in which the plurality of pixels are arranged to be parallel. In addition, a third direction (Z-axis direction) may be a direction perpendicular to both the first direction and the second direction. In addition, descriptions will be provided below based on the first direction (X-axis direction) being a row direction and the second direction (Y-axis direction) being a column direction. In the present specification, the row direction may be used interchangeably with the first direction, and the column direction may be used interchangeably with the second direction.

Due to such a configuration, as will be described below, both depth information and color information may be detected from image data.

In addition, reflected light may pass through the first filter area FA1 and the second filter area FA2 to be received by the sensor 130 thereunder. In this case, an optical signal (reflected light) passing through the first filter area FA1 will be described as a first signal, and an optical signal (reflected light) passing through the second filter area will be described as a second signal.

The sensor 130 may include a first sensing area SA1 for receiving the first signal and a second sensing area SA2 for receiving the second signal. In other words, the sensor 130 may be divided into the first sensing area SA1 and the second sensing area SA2 according to wavelength bands of reflected light passing through the filter F.

First, the first sensing area SA1 may correspond to the first filter area FA1. In other words, the first sensing area SA1 may be an area in which an optical signal passing through the first filter area FA1 arrives at the sensor 130.

Similarly, the second sensing area SA2 may correspond to the second filter area FA2. The second sensing area SA2 may be an area in which an optical signal passing through the second filter area FA2 arrives at the sensor 130.

In addition, since the first sensing area SA1 and the second sensing area SA2 respectively correspond to the first filter area FA1 and the second filter area FA2, the first sensing area SA1 may be disposed to surround the second sensing area SA2.

More specifically, as described above, the sensor 130 may include the plurality of pixels, and the plurality of pixels may be positioned to be parallel in the row direction and the column direction. The second sensing area SA2 may be provided as a plurality of second sensing areas SA2, and the plurality of second sensing areas SA2 may be disposed to be spaced apart from each other.

In addition, each of the second sensing areas SA2 spaced apart from each other may be positioned on at least one pixel. In an exemplary embodiment, each of the second sensing areas SA2 may include a plurality of pixels of which at least portions are disposed to be in contact with each other. In this case, even when a distance between a camera module and an object is varied (for example, when images of various objects disposed different distances are captured), depth information is extracted through the plurality of pixels for each object, thereby improving the accuracy of depth information about a distance to the object.

In the sensor 130, a plurality of pixels PX1-1 to PX9-9 may be arranged in the row direction and the column direction. For example, in the sensor 130, the pixels may have nine rows and nine columns. This means that a first-first pixel is positioned in a first row and a first column. In this case, a second-second pixel, a fourth-second pixel, a sixth-second pixel, an eighth-second pixel, a second-fourth pixel, a fourth-fourth pixel, a sixth-fourth pixel, an eighth-fourth pixel, a second-sixth pixel, a fourth-sixth pixel, a sixth-sixth pixel, an eighth-sixth pixel, a second-eighth pixel, a fourth-eighth pixel, a sixth-eighth pixel, and an eighth-eighth pixel may correspond to be the second sensing areas SA2.

In this case, each pixel corresponding to the second sensing area SA2 may be surrounded by respective pixels of the first sensing area SA1. For example, the second-second pixel may be disposed to be surrounded by first-first to first-third pixels, a second-first pixel, a second-third pixel, and third-first to third-third pixels. Accordingly, even when a distance to an object is changed, the plurality of second sensing areas SA2 are prevented from overlapping each other as much as possible, thereby improving the accuracy of depth information.

In addition, the second sensing areas SA2 may be spaced apart from each other by a predetermined interval. In an exemplary embodiment, widths W2 between adjacent second sensing areas SA2 in the first direction (X-axis direction) may all be the same. In addition, heights h2 between adjacent second sensing areas SA2 in the second direction (Y-axis direction) may all be the same.

In addition, a width of the first filter area FA1 may be different from a width of the first sensing area SA1. Similarly, a width of the second filter area FA2 may be different from a area of the second sensing area SA2. In an exemplary embodiment, the width of the first filter area FA1 may be greater than the width of the first sensing area SA1, and the width of the second filter area FA2 may be greater than the width of the second sensing area SA2.

Furthermore, the width W1 between adjacent second filter areas FA2 in the first direction may be different from the width W2 between adjacent second sensing areas SA2 in the first direction. In an exemplary embodiment, the width W1 between adjacent second filter areas FA2 in the first direction may be greater than the width W2 between adjacent second sensing areas SA2 in the first direction.

The height h1 between adjacent second filter areas FA2 in the second direction may be different from the height h2 between adjacent second sensing areas SA2 in the second direction. In an exemplary embodiment, the height h1 between adjacent second filter areas FA2 in the second direction may be greater than the height h2 between adjacent second sensing areas SA2 in the second direction. Due to such a configuration, the camera module can provide image data having a wider viewing angle through the plurality of pixels of the sensor.

Referring to FIG. 10, a width of a second sensing area may be changed according to a distance to an object O. As an example, the object O may include a first point PO1, a second point PO2, and a third point PO3 which have different distances from a camera module. The first point PO1 may have a longer distance from the camera module than the second point PO2 and the third point PO3. The third point PO3 may have a shorter distance from the camera module than the first point PO1 and the second point PO2.

In this case, a phase delay of reflected light may be different according to distances to the object. For example, reflected light may include first reflected light LS2-1 that is an optical signal reflected from the first point PO1, second reflected light LS2-2 that is an optical signal reflected from the second point PO2, and third reflected light LS2-3 that is an optical signal reflected from the third point PO3.

The first reflected light LS2-1, the second reflected light LS2-2, and the third reflected light LS2-3 may pass through second filter areas FA2 to be received in second sensing areas SA2 of a sensor 130.

In this case, the second sensing areas SA2 may includes a second-first sensing area SA2a for receiving the first reflected light LS2-1, a second-second sensing area SA2b for receiving the second reflected light LS2-2, and a second-third sensing area SA2c for receiving the third reflected light Ls2-3.

A width of the second-first sensing area SA2a may be less than a width of the second-second sensing area SA2b and a width of the second-third sensing area SA2c. The width of the second-second sensing area SA2b may be less than the width of the second-first sensing area SA2a and the width of the second-third sensing area SA2c. The width of the second-third sensing area SA2c may be greater than the width of the second-first sensing area SA2a and the width of the second-second sensing area SA2b.

In addition, when the second-first sensing area SA2a corresponds to one pixel, the second-second sensing area SA2b and the second-third sensing area SA2c may correspond to a plurality of pixels. Accordingly, since the plurality of second sensing areas SA2 may be disposed to be spaced apart from each other, the second sensing areas SA2 may be spaced apart from each other and may not overlap each other in a row direction or a column direction. Accordingly, the camera module according to the exemplary embodiment may calculate depth information reflecting all different distances between the camera module and the object.

Referring to FIG. 11, in a filter, first filter areas may surround a second filter area, and the first filter areas surrounding one second filter area may not overlap each other. In other words, the filter may be provided as a plurality of aggregate filters including the second filter areas and the first filter areas surrounding the second filter area, and the plurality of aggregate filters may not overlap each other in a third direction (Z-axis direction).

In response to such a filter, even in a sensor, first sensing areas SA1 may surround a second sensing area SA2, and the first sensing areas surrounding one second sensing area. SA2 may not overlap each other. In addition, the sensor may include aggregate pixels BDX including the second sensing areas SA2 and the first sensing areas SA1 surrounding the second sensing area SA2. In this case, the plurality of aggregate pixels BDX may be provided and may not overlap each other in the third direction (Z-axis direction). Due to such a configuration, even when a distance to an object is changed, accurate depth measurement may be possible.

FIG. 12 is a diagram for describing a process of generating an electrical signal in a sensor according to an exemplary embodiment.

Referring to FIG. 12, as described above, a phase of reflected input (input light) LS2 may be delayed by as much as a distance by which input light (output light) LS1 is reflected to return after being incident on an object.

In addition, as described above, there may be a plurality of reference signals, and in an exemplary embodiment, as shown in FIG. 12, there may be four reference signals C1 to C4. The reference signals C1 to C4 may each have the same frequency as an optical signal and may have a phase difference of 90°. One signal C1 of the four reference signals may have the same phase as the optical signal.

In a sensor 130, an effective area of the sensor 130 may be exposed in response to each reference signal. The sensor 130 may receive an optical signal during an integration time.

The sensor 130 may mix an input optical signal and each reference signal. Then, the sensor 130 may generate an electrical signal corresponding to a shaded portion of FIG. 12.

In another exemplary embodiment, when optical signals are generated at a plurality of frequencies during an integration time, the sensor 130 absorbs input optical signals according to the plurality of frequencies. For example, it is assumed that optical signals are generated at frequencies f1 and f1 and a plurality of reference signals have a phase difference of 90°. In this case, since incident optical signals also have the frequencies f1 and f2, four electrical signals may be generated through an input optical signal having the frequency f1 and four reference signals corresponding thereto. Four electrical signals may be generated through an input optical signal having the frequency f2 and four reference signals corresponding thereto. Accordingly, a total of eight electrical signals may be generated. Hereinafter, this will be mainly described, but as described above, an optical signal may be generated with one frequency (for example, f1).

FIG. 13 is a diagram for describing a sensor according to an exemplary embodiment, and FIGS. 14 to 17 are diagrams for describing various modified examples of a sensor.

Referring to FIGS. 13 to 17, as described above, a sensor 130 may include a plurality of pixels and have an array structure. In this case, the sensor 130 may be an active pixel sensor (APS) and may be a complementary metal oxide semiconductor (CMOS) sensor. In addition, the sensor 130 may be a charge coupled device (CCD) sensor. In addition, the sensor 130 may include a ToF sensor which receives IR light reflected by a subject to measure a distance using a time difference or a phase difference.

The plurality of pixels may be disposed to be parallel in a first direction and a second direction. As an example, the plurality of pixels may be in the form of a matrix.

In addition, in an exemplary embodiment, the plurality of pixels may include first pixels P1 and second pixels P2. The first pixel P1 and the second pixel P2 may be alternately disposed in the first direction and the second direction. That is, with respect to one first pixel P1, the plurality of second pixels P2 may be disposed adjacent to each other in the first direction and the second direction. For example, in the sensor 130, the first pixel P1 and the second pixel P2 may be disposed in a checkerboard pattern.

In addition, the first pixel P1 and the second pixel P2 may be pixels that receive light beams having different wavelength bands as peak wavelengths. For example, the first pixel P1 may receive light having an IR band as a peak wavelength. The second pixel P2 may receive light having a wavelength excluding an IR band as a peak wavelength.

In addition, any one of the first pixel P1 and the second pixel P2 may not receive light. In an exemplary embodiment, the plurality of pixels may include an effective area SA in which a light-receiving element is disposed and a non-effective area IA other than the effective area.

The effective area SA may receive light to generate a predetermined electrical signal, and the non-effective area IA may be an area that receives light to not generate an electrical signal or does not receive light. That is, the non-effective area IA may have a meaning including a case in which an electrical signal cannot be generated by light even when a light-receiving element is positioned in the non-effective area IA.

The first pixel P1 may include the effective area SA, but the second pixel P2 may include only the non-effective area IA in which the effective area SA is not present. For example, a light-receiving element such as a photodiode may be positioned only in the first pixel and may not be positioned in the second pixel. In addition, for example, the sensor 130 may include a plurality of row areas RR including the effective area SA and the non-effective area IA which are alternately arranged in a row direction. Furthermore, in an exemplary embodiment, the sensor 130 may include a plurality of column areas CR including the effective area SA and the non-effective area which are alternately disposed in a column direction.

In an exemplary embodiment, the sensor 130 may include a first row area RR1 in which the effective area SA and the non-effective area IA are alternately disposed, and a second row area RR2 in which the effective area SA and the non-effective area IA are alternately disposed in the row direction and the effective area is disposed at a position that does not overlap the effective area of the first row area RR1 in the column direction. Accordingly, the sensor 130 may include the plurality of column areas CR including the effective area SA and the non-effective area IA which are alternately arranged in the column direction.

In addition, the first pixel P1 and the second pixel P2 may have various shapes such as a quadrangular shape, a triangular shape, a polygonal shape, and a circular shape. The effective area AS may also have various shapes such as a quadrangular shape, a triangular shape, a polygonal shape, and a circular shape (see FIGS. 14 and 15).

In addition, components electrically connected to an adjacent first pixel P1 may be positioned in the second pixel P2. The above-described components may include electrical elements such as a wire and a capacitor. In addition, the above-described components may be positioned on the first pixel or the second pixel (see FIG. 14).

In an exemplary embodiment, each pixel may be an area defined by an interval between the same adjacent effective areas in an arrangement direction (for example, the first direction or the second direction) on the sensor. Here, the same effective areas refer to effective areas having the same function (for example, effective areas for receiving light beams having the same wavelength band).

In addition, the first pixel P1 may have only the effective area SA or may have both the effective area SA and the non-effective area IA. The effective area SA may be present at each of various positions within the first pixel P1. Accordingly, a center of the pixel and a center of the effective area may be different, but descriptions will be provided below based on the center of the pixel and the center of the effective area being the same.

In addition, as shown in FIG. 13, in the case of a sensor 130 having a resolution of 320×240, 76,800 pixels may be arranged in a grid form. In this case, the plurality of pixels may be disposed to be spaced apart from each other by a predetermined interval. That is, a certain interval L may be formed between the plurality of pixels as in a shaded portion of FIG. 15. A width L of the interval L may be much less than a size of the pixel. In addition, the above-described wire and the like may be disposed in such an interval L. In the present specification, descriptions will be provided by ignoring the interval L.

In addition, in an exemplary embodiment, each pixel 132 (for example, a first pixel) may include a first light-receiving unit 132-1 including a first photodiode and a first transistor and a second light-receiving unit 132-2 including a second photodiode and a second transistor.

The first light-receiving unit 132-1 receives an input optical signal in the same phase as a waveform of output light. That is, at a time at which a light source is turned on, the first photodiode is turned on to absorb input optical signal. At a time at which the light source is turned off, the first photodiode is turned off to stop absorbing input light. The first photodiode converts the absorbed input optical signal into a current and transmits the current to the first transistor. The first transistor converts the received current into an electrical signal and outputs the electrical signal.

The second light receiving unit 132-2 receives an input light signal in a phase opposite to that of a waveform of output light. That is, at a time at which the light source is turned on, the second photodiode is turned off to absorb an input optical signal. At a time at which the light source is turned off, the second photodiode is turned on to stop absorbing input light. The second photodiode converts the absorbed input optical signal into a current and transmits the current to the second transistor. The second transistor converts the received current into an electrical signal.

Therefore, the first light-receiving unit 132-1 may be referred to as an in-phase receiving unit, and the second light-receiving unit 132-2 may be referred to as an out-phase receiving unit. As described above, when the first light-receiving unit 132-1 and the second light-receiving unit 132-2 are activated with a time difference, a difference in amount of received light occurs according to a distance to an object. For example, when an object is right in front of a camera module 100 (that is, when a distance=zero), since a time taken for light to be output from an optical output unit 110 and then reflected from the object is zero, an on/off period of the light source is a reception period of light without any change. Accordingly, only the first light-receiving unit 132-1 receives light, and the second light-receiving unit 132-2 does not receive light. As another example, when an object is positioned to be spaced a predetermined distance from the camera module 100, since it takes time for light to be output from the optical output unit 110 and then reflected from the object, an on/off period of the light source is different from a reception period of light. Accordingly, a difference occurs between an amount of light received by the first light-receiving unit 132-1 and an amount of light received by the second light-receiving unit 132-2. That is, a distance to an object may be calculated using a difference between an amount of light input to the first light-receiving unit 132-1 and an amount of light input to the second light-receiving unit 132-2. In other words, a control unit 140 calculates a phase difference between output light and input light using an electrical signal received from the sensor 130 and calculates a distance between the object and the camera module 100 using the phase difference.

More specifically, the control unit 140 may calculate the phase difference between the output light and the input light using electric charge amount information of the electrical signal.

As described above, four electrical signals may be generated for each frequency of an optical signal. Accordingly, the control unit 140 may calculate a phase difference td between an optical signal and an input optical signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ denote electric charge amounts of four electrical signals. $Q_1$ denotes an electric charge amount of an electrical signal corresponding to a reference signal having the same phase as the optical signal. $Q_2$ denotes an electric charge amount of an electrical signal corresponding to a reference signal having a phase delayed more than that of the optical signal by 180°. $Q_3$ denotes an electric charge amount of an electrical signal corresponding to a reference signal having a phase delayed more than that of the optical signal by 90°. $Q_4$ denotes an electric charge amount of an electrical signal corresponding to a reference signal having a phase delayed more than that of the optical signal by 270°.

The control unit 140 may calculate a distance between an object and the camera module 100 using a phase difference between an optical signal and an input optical signal. In this case, the control unit 140 may calculate a distance d (see Equation 2) between the object and the camera module 100 using Equation 2 below.

$$d = \frac{c}{2f}\frac{t_d}{2\pi} \quad \text{[Equation 2]}$$

Here, c denotes the speed of light, and f denotes a frequency of output light.

According to an exemplary embodiment, a ToF IR image and a depth image may be acquired from the camera module 100. Accordingly, the camera module according to the exemplary embodiment of the present invention may be referred to as a ToF camera module or a ToF camera device.

More specifically, as shown in FIG. 18, the camera module 100 according to the exemplary embodiment may generate raw images for four phases. Here, the four phases may be 0°, 90°, 180°, and 270°, and the raw image for each phase may be an image having a pixel value digitized for each phase and may be used interchangeably with a phase image, a phase IR image, and the like. In this case, the raw images for the four phases may be acquired through an electrical signal generated from a second sensing area, and each of images shown in FIGS. 18 to 20 may be an image acquired for each phase when an entire area of a sensor is operated as a second sensing area or may be acquired from the image.

FIG. 18 shows raw images for four phases acquired from a camera module according to an exemplary embodiment, FIG. 19 shows an amplitude image acquired from a camera module according to an exemplary embodiment, and FIG. 20 shows depth images acquired from a camera module according to an exemplary embodiment.

Referring to FIGS. 18 and 19, when calculation is performed as in Equation 3 using four phase images Raw($x_0$), Raw($x_{90}$), Raw($x_{180}$), and Raw($x_{270}$) (see FIG. 18), it is possible to acquire an amplitude image (see FIG. 19) which is a ToF IR image.

$$\text{Amplitude} = \frac{1}{2}\sqrt{(\text{Raw}(x_{90}) - \text{Raw}(x_{270}))^2 + (\text{Raw}(x_{180}) - \text{Raw}(x_0))^2} \quad \text{[Equation 3]}$$

Here, Raw($x_0$) may denote a data value for each pixel received in a phase of 0° by a sensor, Raw($x_{90}$) may denote a data value for each pixel received in a phase of 90° by the sensor, Raw($x_{180}$) may denote a data value for each pixel received in a phase of 180° by the sensor, and Raw($x_{270}$) may denote a data value for each pixel received in a phase of 270° by the sensor.

When calculation is performed as in Equation 4 using the four phase images of FIG. 18, it is possible to acquire an intensity image which is another ToF IR image.

$$\text{Intensity} = |\text{Raw}(x_{90}) - \text{Raw}(x_{270})| + |\text{Raw}(x_{180}) - \text{Raw}(x_0)| \quad \text{[Equation 4]}$$

Here, Raw($x_0$) may denote a data value for each pixel received in a phase of 0° by the sensor, Raw($x_{90}$) may denote a data value for each pixel received in a phase of 90° by the sensor, Raw($x_{180}$) may denote a data value for each pixel received in a phase of 180° by the sensor, and Raw($x_{270}$) may denote a data value for each pixel received in a phase of 270° by the sensor.

As described above, the ToF IR image may be generated through a process of respectively subtracting two phase images from other two phase images among the four phase images. For example, two phase images of which one phase image is subtracted from another image may have a phase difference of 180°. In the process of respectively subtracting two phase images from other two phase images, background light may be removed. Accordingly, only a signal in a wavelength band output by a light source remains in the ToF IR image, thereby increasing IR sensitivity with respect to an object and significantly reducing noise.

In the present specification, the ToF IR image may refer to the amplitude image or the intensity image, and the intensity image may be used interchangeably with a confidence image. As shown in FIG. 19, the ToF IR image may be a gray image.

Meanwhile, when calculation is performed as in Equations 5 and 6 using the four phase images of FIG. 18, it is also possible to acquire depth images of FIG. 20. Equations 5 and 6 may correspond to Equations 1 and 2 described above, respectively.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 5]}$$

$$\text{Depth} = \frac{1}{2f}c\frac{\text{Phase}}{2\pi} \quad (c = \text{speed of light}) \quad \text{[Equation 6]}$$

FIG. 21 shows diagrams for describing an operation of obtaining depth information and color information in a camera module according to an exemplary embodiment.

Referring to FIG. 21, as described above, depth information for each pixel may be acquired through four phase images acquired during an integration time, and such depth information may be acquired through an electrical signal in a second sensing area SA2. In addition, color information may be acquired through an electrical signal of a first sensing area SA1. The first sensing area SA1 and the second sensing area SA2 may be positioned to overlap the above-described pixels or effective areas.

In this case, the second sensing area SA2 may be changed according to a distance to an object, and in an exemplary embodiment, the second sensing area SA2 may be positioned on a sensor 130 so as to overlap some of the plurality of pixels. In other words, the first sensing area SA1 may also be positioned to overlap some of the plurality of pixels. Hereinafter, descriptions will be provided based on nine pixels adjacent to the second sensing area SA2, wherein the nine pixels may be different from the pixels described above with reference to FIGS. 7 to 11.

Among the nine pixels, in a row direction, first-first to first-third pixels P1a to 1P1c may be positioned in a first row, second-first to second-third pixels P2a to P2c may be positioned in a second row, and third-first to third-third pixels P3a to P3c may be positioned in a third row.

In addition, the second sensing area SA2 may overlap a partial area of each of the first-first to first-third pixels P1a to 1P1c, the second-first pixel P2a, the second-third pixel P2c, and the third-first to third-third pixels P3a to P3c. That is, an entire area of the second-second pixel P2b may overlap the second sensing area SA2, but partial areas of the remaining pixels may overlap the second sensing area SA2.

In this case, according to an exemplary embodiment, a control unit may acquire depth information for an object from the second-second pixel P2b. However, since entire areas of the remaining pixels adjacent to the second-second pixel P2b do not overlap the second sensing area SA2, an error may be present in an electrical signal generated in the remaining pixels.

Accordingly, in an exemplary embodiment, in order to acquire a high resolution depth image to be described below, a path of reflected light may be changed by moving an optical unit, a sensor, or the like. In addition, depth information of the remaining pixels may be calculated by changing a path of reflected light and using an interpolation technique for depth information of a pixel adjacent to each of the remaining pixels.

In an exemplary embodiment, the interpolation technique may include linear interpolation, polynomial interpolation, spline interpolation, exponential interpolation, log linear interpolation, Lagrange interpolation, Newton interpolation, bilinear interpolation, geographic interpolation, and the like. For example, depth information of the first-first pixel P1a may be calculated using depth information of each of the first-second pixel P1b, the second-first pixel P2a, and the second-second pixel P2b which are pixels adjacent to the first-first pixel P1a. In this case, different weights may be applied to the first-second pixel P1b, the second-first pixel P2a, and the second-second pixel P2b which are pixels adjacent to the first-first pixel P1a. A speed for acquiring depth information may be improved due to such an interpolation technique.

In addition, the first sensing area SA1 may overlap a partial area of each of the first-first to first-third pixels P1a to 1P1c, the second-first pixel P2a, the second-third pixel P2c, and the third-first to third-third pixels P3a to P3c. That is, an entire area of the second-second pixel P2b may overlap the first sensing area SA1, but partial areas of the remaining pixels may overlap the first sensing area SA1.

In this case, in an exemplary embodiment, the control unit may acquire color information of an object from the second-second pixel P2b. However, since entire areas of the remaining pixels adjacent to the second-second pixel P2b do not overlap the first sensing area SA1, some errors may be present in color information acquired from an electrical signal generated in the remaining pixels.

Accordingly, similarly to the above-described depth information, a path of reflected light may be changed by moving the optical unit, the sensor, or the like. Through the changed path of the reflected light, the remaining pixels may be positioned such that the entire areas thereof overlap the first sensing area SA1. In addition, color information of the remaining pixels may be calculated using an interpolation technique for color information of a pixel adjacent to each of the remaining pixels.

FIG. 22 is a block diagram of a calculation unit according to an exemplary embodiment, and FIGS. 23 to 25 are diagrams for describing an image control method in a camera module according to an exemplary embodiment.

Referring to FIG. 22, the calculation unit according to the exemplary embodiment may output three-dimensional (3D) content for an object using color information and depth information of the object acquired by a control unit. As described above, since the control unit acquires both depth information and color information from one image or images, a depth image through the depth information and a color image through the color information can be acquired through a single process rather than separate processes, thereby reducing a calculation amount to improve a processing speed. That is, calibration or alignment between the depth image and the color image may not be performed. In addition, since one sensor is provided, reliability can be improved in the event of an impact, and power consumption can be reduced.

More specifically, the calculation unit 150 according to the exemplary embodiment may include an image generator 151, an extractor 152, a map generator 9153, and a content generator 154.

First, the image generator 151 may generate a plurality of images using color information of an object and depth information of the object acquired by the control unit. In this case, the plurality of images may include both color information and depth information. In other words, the image may have a depth image from depth information in a partial area thereof and a color image from color information in the other area thereof.

The extractor 152 may extract a feature point of each of the plurality of images. In this case, the feature point may correspond to a position of the depth information of the object. In other words, the feature point may correspond to a second sensing area. Also, the size or position of the feature point may be changed according to a change in optical path. In addition, a size of the feature point may be increased according to the above-described interpolation technique, and since the feature point corresponds to the second sensing area, the feature point may be easily calculated in the image.

The map generator 153 may generate a depth map using the calculated feature point. In other words, the map generator 153 may calculate depth information about an entire area of the image by applying a simultaneous localization and mapping (SLAM) technology to the feature point. The SLAM technology refers to a technology for recognizing its own position in a moving device and simultaneously mapping a surrounding environment. In this case, a position may be recognized by matching color information of each color image with each position in a plurality of images. The position may be recognized by matching feature points in a two-dimensional image with 3D coordinates and obtaining a projection matrix to which homogeneous coordinates are applied. The depth map may be calculated by matching each feature point with a point in an image from the image having a color image and a depth image. In this case, position recognizing and mapping may be complementarily performed.

The content generator 154 may generate 3D content by applying the depth map to a plurality of images.

Referring to FIGS. 23 and 24, a plurality of images may be shifted in one direction (right direction in the drawing). In this case, the calculation unit according to the exemplary embodiment may estimate a state vector of a $(k+1)^{th}$ image and position information of a landmark using a state vector X of a $k^{th}$ image, a shift displacement U, and an observation vector Z of a landmark m on a frame. That is, the calculation unit may estimate a camera state vector $X_{k+1}$ of a $(k+1)^{th}$ frame and position information of a landmark mk using a state vector $X_k$ of the $k^{th}$ image, a $k^{th}$ shift displacement $U_k$, a landmark mj on an image, and an observation vector $Z_k$. By repeating such a method, position information can be estimated, and depth information, which is not acquired, about pixels can be estimated. Accordingly, a depth map of an entire area of an image can be calculated, and finally, 3D content can be calculated.

FIGS. 26 to 28 are diagrams for describing a control method for acquiring high resolution in a camera module according to an exemplary embodiment.

Referring to FIGS. 26 to 28, in an exemplary embodiment, in order to increase a resolution of a depth image, a super resolution (SR) technique may be used. First, in an exemplary embodiment, as described above, the camera module may change a path of reflected light received by a sensor 130 to acquire a high resolution image using an SR technique. As an example, a path of reflected light received for each predetermined magnitude by the sensor may be changed, and FIG. 26 shows a change in path of reflected light when the reflected light is shifted by 0.5 pixels. However, the change in path of reflected light is not limited thereto.

In addition, in an exemplary embodiment, a control unit may control the movement of an optical unit or the sensor to shift input optical signal by a predetermined shifting distance on the sensor. The control unit may control a variable lens of the optical unit to shift the input optical signal by a predetermined shifting distance on the sensor. In addition, the control unit may control a filter of the optical unit to shift the input optical signal by a predetermined shifting distance on the sensor. For example, the input optical signal may be shifted on the sensor by tilting the filter of the optical unit. Although not shown, a camera module may include a driver for tilting the filter. The driver may drive the filter using a driving force such as a voice coil motor (VCM) type or a piezo-type.

An SR technique is a technique for acquiring a high resolution image from a plurality of low resolution images, and a mathematical model of the SR technique may be represented by Equation 7.

$$y_k = D_k B_k M_k x + n_k \quad \text{[Equation 7]}$$

Here, $1 \leq k \leq p$, p denotes the number of low resolution images, $y_k$ denotes low resolution images $[y_{k1}, y_{k2}, \ldots,$ and $y_{kM}]T$ (wherein $M=N_1 \times N_2$), $D_k$ denotes a down sampling matrix, Br denotes an optical blur matrix, $M_k$ refers to an image warping matrix, x refers to high resolution images $[x_1, x_2, \ldots,$ and $x_N]T$ (wherein $N=L_1N_1 \times L_2N2$), and $n_k$ denotes noise. That is, the SR technique refers to a technique for estimating x by applying an inverse function of estimated resolution degradation factors to yr. The SR technique may be mainly classified into a statistical method and a multi-frame method, and the multi-frame method may be mainly classified into a space division method and a time division method. When the SR technique is used to acquire a depth image, since an inverse function of $M_k$ in Equation 1 is not present, the statistical method may be attempted. However, since the statistical method requires an iterative calculation process, there is a problem of low efficiency.

In order to apply the SR technique to depth information extraction, the control unit may generate a plurality of low resolution subframes LRSF using an electrical signal received from the sensor 130 and then may extract a plurality of low resolution images LRI and a plurality of pieces of low resolution depth information using the plurality of low resolution subframes LRSF. High resolution depth information may be extracted by rearranging pixel values of the plurality of pieces of low resolution depth information. Accordingly, the calculation unit may finally output a high resolution depth image HRDI. In the present specification, high resolution is a relative meaning indicating resolution that is higher than low resolution.

In addition, the subframe may refer to image data generated from an electrical signal corresponding to any one exposure period and a reference signal. For example, when an electrical signal is generated through eight reference signals in one exposure period, that is, one image frame, eight subframes may be generated, and one start of a frame may be further generated. In the present specification, the subframe may be used interchangeably with image data, subframe image data, or the like.

Alternatively, in order to apply the SR technique according to the exemplary embodiment of the present invention to depth information extraction, the calculation unit 150 may generate a plurality of low resolution subframes LRSF and a plurality of low resolution images LRI including the plurality of low resolution subframes LRSF and then may generate a plurality of high resolution subframes HRSF by rearranging pixel values of the plurality of low resolution subframes LRSF. The high resolution subframes HRSF may be used to extract high resolution depth information and generate a high resolution depth image HRDI. As described above, high resolution depth information may be extracted through such a method, and the method may be equally applied to each of exemplary embodiments described below or modifications thereof (see FIG. 27).

In addition, in order to extract such high resolution depth information, after a plurality of subframes, which are each shifted by a predetermined shifting distance, are acquired, a plurality of high resolution subframes HRSF may be acquired by applying an SR technique for each subframe, and depth information for each subframe may be extracted using the high resolution subframes HRSF to extract an high resolution depth image HRDI (see FIG. 28).

Meanwhile, when a camera module 100 according to an exemplary embodiment of the present invention is applied to an application in which high quality image capture is required, for example, when the camera module 100 is applied to an application in which a precise image is required, as in biometric authentication, or when the camera module 100 is applied to an application in which a user should operate the camera module 100 and take a picture using only one hand, a technique for preventing or correcting image shake caused by hand shake is also required. A technique for preventing or correcting image shake may be referred to as an optical image stabilizer (OIS) technique. In the OIS technique, when an optical axis is a Z-axis, by using a method of moving a structure within the camera module 100, for example, a lens or the like, in an X-axis and a Y-axis perpendicular to the optical axis, image shake may be prevented or corrected.

In addition, in order for the camera module 100 to have an SR function and an OIS function, the camera module 100 according to the exemplary embodiment of the present invention may further include a driver for moving the structure therein.

The present invention has been described based on the exemplary embodiments, but the exemplary embodiments are for illustrative purposes and do not limit the present invention, and those skilled in the art will appreciate that various modifications and applications, which are not exemplified in the above description, may be made without departing from the scope of the essential characteristic of the present exemplary embodiments. For example, each component described in detail in the exemplary embodiment can be modified. Further, the differences related to the modification and the application should be construed as being included in the scope of the present invention defined in the appended claims.

The invention claimed is:

1. A camera module comprising:
an optical output unit configured to output an optical signal to an object;
a filter configured to allow an optical signal reflected by the object to pass therethrough;
a sensor configured to receive the passed optical signal; and
a control unit configured to acquire depth information of the object and color information of the object adjacent to the depth information of the object using the optical signal received by the sensor,
wherein the filter includes a first filter area through which a first wavelength band as a pass band passes and a second filter area through which a second wavelength band different from the first wavelength band as a pass band passes,
wherein the sensor includes a first sensing area for receiving a first signal and a second sensing area for receiving a second signal,
wherein the control unit acquires the color information of the object from the first sensing area and acquires the depth information of the object from the second sensing area,
wherein the first signal is an optical signal that passes through the first filter area, and
wherein the second signal is an optical signal that passes through the second filter area.

2. The camera module of claim 1, wherein the first filter area surrounds the second filter area.

3. The camera module of claim 2, wherein the first sensing area surrounds the second sensing area.

4. The camera module of claim 1, wherein the second sensing area is provided as a plurality of second sensing areas spaced apart from each other.

5. The camera module of claim 4, wherein the adjacent second sensing areas have the same distance in a row direction or a column direction.

6. The camera module of claim 4, wherein each of the second sensing areas includes a plurality of pixels of which at least portions are disposed in contact with each other.

7. The camera module of claim 1, wherein the optical output unit includes a light collection unit configured to output the optical signal in a form of a plurality of arrays.

8. The camera module of claim 1, further comprising a calculation unit configured to output three-dimensional content for the object using the acquired color information of the object and the acquired depth information of the object.

9. The camera module of claim 8, wherein the calculation unit includes:
an image generator configured to generate a plurality of images using the acquired color information of the object and the acquired depth information of the object;
an extractor configured to extract a feature point of each of the plurality of images;
a map generator configured to generate a depth map using the feature point; and
a content generator configured to generate the three-dimensional content by applying the depth map to the plurality of images.

10. The camera module of claim 9, wherein the feature point corresponds to a position of the acquired depth information of the object.

11. The camera module of claim 1, wherein the sensor includes an effective area in which a light-receiving element is disposed and a non-effective area other than the effective area.

12. The camera module of claim 11, wherein the sensor includes a first row area in which the effective area and the non-effective area are alternately disposed in a row direction, and
wherein a second row area in which the effective area and the non-effective area are alternately disposed in the row direction and the effective area is disposed at a position that does not overlap the effective area of the first row area in a column direction.

13. The camera module of claim 11, wherein the first sensing area and the second sensing area may overlap the effective area.

14. The camera module of claim 11, wherein a width of the second sensing area may be changed according to a distance between the object and the optical output unit.

15. The camera module of claim 1, wherein the first sensing area corresponds to the first filter area.

16. The camera module of claim 1, wherein the first sensing area is an area in which an optical signal passing through the first filter area arrives at the sensor.

17. The camera module of claim 1, wherein the second sensing area corresponds to the second filter area.

18. The camera module of claim 1, wherein the second sensing area is an area in which an optical signal passing through the second filter area arrives at the sensor.

19. The camera module of claim 1, wherein each pixel corresponding to the second sensing area is surrounded by each pixel corresponding to the first sensing area.

20. The camera module of claim 1, wherein a width of the second filter area is different from a width of the second sensing area.

* * * * *